US012236447B2

(12) United States Patent
Mullen et al.

(10) Patent No.: US 12,236,447 B2
(45) Date of Patent: Feb. 25, 2025

(54) PAYMENT DEVICE APPLETS WITH PRE-STORED MESSAGES AND TRIGGERABLE LOGIC

(71) Applicant: Dynamics Inc., Cheswick, PA (US)

(72) Inventors: Jeffrey D. Mullen, Glenshaw, PA (US); Keith Huthmacher, Pittsburgh, PA (US)

(73) Assignee: Dynamics Inc., Cheswick, PA (US)

( * ) Notice: Subject to any disclaimer, the term of this patent is extended or adjusted under 35 U.S.C. 154(b) by 0 days.

(21) Appl. No.: 17/064,503

(22) Filed: Oct. 6, 2020

(65) Prior Publication Data

US 2021/0103917 A1    Apr. 8, 2021

Related U.S. Application Data

(60) Provisional application No. 63/048,073, filed on Jul. 3, 2020, provisional application No. 62/987,276, filed on
(Continued)

(51) Int. Cl.
*G06Q 30/00* (2023.01)
*G06F 9/54* (2006.01)
(Continued)

(52) U.S. Cl.
CPC ......... *G06Q 30/0229* (2013.01); *G06F 9/542* (2013.01); *G06K 7/087* (2013.01);
(Continued)

(58) Field of Classification Search
CPC ... G06Q 30/0229; G06Q 20/02; G06Q 20/204
See application file for complete search history.

(56) References Cited

U.S. PATENT DOCUMENTS 4,353,064 A    10/1982  Stamm
4,394,654 A     7/1983  Hofmann-Cerfontaine
(Continued)

FOREIGN PATENT DOCUMENTS

EP    0203683    12/1986
GB    2420098     5/2006
(Continued)

OTHER PUBLICATIONS

U.S. Appl. No. 60/594,300, Poidomani et al.
(Continued)

*Primary Examiner* — Rokib Masud
(74) *Attorney, Agent, or Firm* — Morris Law Group; Robert W. Morris

(57) ABSTRACT

A system may include a payment card that includes one or more chips that are operable to utilize information in a payment transaction to enact different functions. For example, a payment applet in a contact chip transaction (e.g., contact EMV transaction) or contactless chip transaction (e.g., contactless EMV transaction) may utilize information that flows through the chip (e.g., country, time, date, transaction amount, approval status) to trigger pre-stored messages or functions (e.g., switch to a payment option or account). Information may be introduced into the chip during a transaction as a result of manual input from the cardholder on the cardholder's phone or other device. Thus, transaction scripting (e.g., EMV scripting) may be utilized to let a card (e.g., static or powered) know that a function (e.g., change of account) is desired by a cardholder and the chip may, if not in the proper account, reset and restart the chip in a mode associated with the desired function (e.g., in the desired account).

11 Claims, 11 Drawing Sheets

Related U.S. Application Data on Mar. 9, 2020, provisional application No. 62/987,279, filed on Mar. 9, 2020, provisional application No. 62/967,539, filed on Jan. 29, 2020, provisional application No. 62/934,343, filed on Nov. 12, 2019, provisional application No. 62/927,664, filed on Oct. 29, 2019, provisional application No. 62/911,357, filed on Oct. 6, 2019.

(51) Int. Cl.

| | | |
|---|---|---|
| *G06K 7/08* | (2006.01) | |
| *G06K 7/10* | (2006.01) | |
| *G06K 19/07* | (2006.01) | |
| *G06K 19/077* | (2006.01) | |
| *G06Q 20/02* | (2012.01) | |
| *G06Q 20/20* | (2012.01) | |
| *G06Q 20/34* | (2012.01) | |
| *G06Q 20/36* | (2012.01) | |
| *G06Q 20/40* | (2012.01) | |
| *G06Q 30/0226* | (2023.01) | |
| *H04L 9/08* | (2006.01) | |
| *G06K 19/06* | (2006.01) | |
| *G06Q 20/32* | (2012.01) | |
| *G06Q 30/018* | (2023.01) | |
| *G06Q 30/0207* | (2023.01) | |
| *G06Q 40/02* | (2023.01) | |

(52) U.S. Cl.
CPC ..... *G06K 7/10366* (2013.01); *G06K 19/0708* (2013.01); *G06K 19/0723* (2013.01); *G06K 19/07737* (2013.01); *G06K 19/07773* (2013.01); *G06Q 20/02* (2013.01); *G06Q 20/204* (2013.01); *G06Q 20/341* (2013.01); *G06Q 20/353* (2013.01); *G06Q 20/3567* (2013.01); *G06Q 20/3572* (2013.01); *G06Q 20/367* (2013.01); *G06Q 20/40* (2013.01); *G06Q 20/401* (2013.01); *G06Q 20/4012* (2013.01); *H04L 9/088* (2013.01); *G06K 19/06206* (2013.01); *G06K 19/07716* (2013.01); *G06K 19/07749* (2013.01); *G06Q 20/322* (2013.01); *G06Q 20/342* (2013.01); *G06Q 20/352* (2013.01); *G06Q 30/0185* (2013.01); *G06Q 30/0215* (2013.01); *G06Q 40/02* (2013.01)

(56) References Cited

U.S. PATENT DOCUMENTS

| | | |
|---|---|---|
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,789,776 A | 12/1988 | Inoue |
| 4,791,283 A | 12/1988 | Burkhardt |
| 4,797,542 A | 1/1989 | Hara |
| 4,902,146 A | 2/1990 | Ishikawa |
| 5,038,251 A | 8/1991 | Sugiyama et al. |
| 5,168,520 A | 12/1992 | Weiss |
| 5,237,614 A | 8/1993 | Weiss |
| 5,254,843 A | 10/1993 | Hynes et al. |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Wallerstein |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,748,737 A | 5/1998 | Daggar |
| 5,834,747 A | 11/1998 | Cooper |
| 5,834,756 A | 11/1998 | Gutman et al. |
| 5,844,230 A | 12/1998 | Lalonde |
| 5,856,661 A | 1/1999 | Finkelstein et al. |
| 5,864,623 A | 1/1999 | Messina et al. |
| 5,883,377 A | 3/1999 | Chapin |
| 5,886,874 A | 3/1999 | Onoda et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,955,961 A | 9/1999 | Wallerstein |
| 5,956,699 A | 9/1999 | Wong et al. |
| 6,012,636 A | 1/2000 | Smith |
| 6,022,761 A | 2/2000 | Grupen-Shemansky et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,129,277 A | 10/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Ill et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,398,115 B2 | 6/2002 | Krause |
| 6,402,029 B1 | 6/2002 | Gangi |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,097,108 B2 | 8/2006 | Zellner et al. |

(56) References Cited

U.S. PATENT DOCUMENTS

| | | |
|---|---|---|
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,193,503 B2 | 3/2007 | Fisher |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Lin et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Nisbet et al. |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,416 B2 | 9/2009 | Blossom |
| 7,591,426 B2 | 9/2009 | Osterweil et al. |
| 7,591,427 B2 | 9/2009 | Osterweil |
| 7,602,904 B2 | 10/2009 | Juels et al. |
| 7,621,458 B2 | 11/2009 | Zellner et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,681,232 B2 | 3/2010 | Nordentoft et al. |
| 7,828,207 B2 | 11/2010 | Cooper |
| 7,954,724 B2 | 6/2011 | Poidomani et al. |
| 8,490,880 B2 * | 7/2013 | Tanner .............. G06K 19/07779 235/487 |
| 2001/0034702 A1 | 10/2001 | Mockett et al. |
| 2001/0047335 A1 | 11/2001 | Arndt et al. |
| 2002/0043566 A1 | 4/2002 | Goodman et al. |
| 2002/0047049 A1 | 4/2002 | Perron et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2002/0153424 A1 | 10/2002 | Chuan |
| 2003/0034388 A1 | 2/2003 | Routhenstein et al. |
| 2003/0052168 A1 | 3/2003 | Wong |
| 2003/0057278 A1 | 3/2003 | Wong |
| 2003/0111527 A1 | 6/2003 | Blossom |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0209608 A1 | 11/2003 | Blossom |
| 2003/0218066 A1 | 11/2003 | Fernandes et al. |
| 2003/0226899 A1 | 12/2003 | Finkelstein |
| 2004/0011877 A1 | 1/2004 | Reppermund |
| 2004/0035942 A1 | 2/2004 | Silverman |
| 2004/0133787 A1 | 7/2004 | Doughty |
| 2004/0159700 A1 | 8/2004 | Khan et al. |
| 2004/0162732 A1 | 8/2004 | Rahim et al. |
| 2004/0172535 A1 | 9/2004 | Jakobsson |
| 2004/0177045 A1 | 9/2004 | Brown |
| 2004/0206829 A1 | 10/2004 | Welling et al. |
| 2005/0001711 A1 | 1/2005 | Doughty et al. |
| 2005/0043997 A1 | 2/2005 | Sohata et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0092830 A1 | 5/2005 | Blossom |
| 2005/0116026 A1 | 6/2005 | Burger et al. |
| 2005/0119940 A1 | 6/2005 | Concilio et al. |
| 2005/0133590 A1 | 6/2005 | Rettenmyer et al. |
| 2005/0154643 A1 | 7/2005 | Doan et al. |
| 2005/0178827 A1 | 8/2005 | Shatford |
| 2005/0194452 A1 | 9/2005 | Nordentoft et al. |
| 2005/0218229 A1 | 10/2005 | Morley et al. |
| 2005/0219728 A1 | 10/2005 | Durbin et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0131393 A1 | 6/2006 | Cok et al. |
| 2006/0131410 A1 | 6/2006 | Fernandes et al. |
| 2006/0161435 A1 | 7/2006 | Atef et al. |
| 2006/0161789 A1 | 7/2006 | Doughty et al. |
| 2006/0163353 A1 | 7/2006 | Moulette et al. |
| 2006/0174104 A1 | 8/2006 | Crichton et al. |
| 2006/0186209 A1 | 8/2006 | Narendra et al. |
| 2006/0196931 A1 | 9/2006 | Holtmanns et al. |
| 2006/0249574 A1 | 11/2006 | Brown et al. |
| 2006/0256961 A1 | 11/2006 | Brainard et al. |
| 2006/0261174 A1 | 11/2006 | Zellner et al. |
| 2006/0283958 A1 | 12/2006 | Osterweil |
| 2007/0017975 A1 | 1/2007 | Lewis et al. |
| 2007/0023532 A1 | 2/2007 | Narendra et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0131759 A1 | 6/2007 | Brown et al. |
| 2007/0136211 A1 | 6/2007 | Brown et al. |
| 2007/0138299 A1 | 6/2007 | Mitra |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0192249 A1 | 12/2007 | Biffle et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0093467 A1 | 4/2008 | Narendra et al. |
| 2008/0096326 A1 | 4/2008 | Reed |
| 2008/0121726 A1 | 5/2008 | Brady et al. |

(56) References Cited

U.S. PATENT DOCUMENTS

| | | |
|---|---|---|
| 2008/0126260 A1 | 5/2008 | Cox et al. |
| 2008/0126398 A1 | 5/2008 | Cimino |
| 2008/0128515 A1 | 6/2008 | Di Lorio |
| 2008/0148394 A1 | 6/2008 | Poidomani et al. |
| 2008/0201264 A1 | 8/2008 | Brown et al. |
| 2008/0209550 A1 | 8/2008 | Di Lorio |
| 2008/0288699 A1 | 11/2008 | Chichierchia |
| 2008/0290166 A1 | 11/2008 | von Mueller |
| 2008/0294930 A1 | 11/2008 | Varone et al. |
| 2008/0302877 A1 | 12/2008 | Musella et al. |
| 2009/0006262 A1 | 1/2009 | Brown et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0048971 A1 | 2/2009 | Hathaway et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159701 A1 | 6/2009 | Mullen |
| 2009/0159708 A1 | 6/2009 | Mullen |
| 2009/0173782 A1 | 7/2009 | Muscato |
| 2009/0240592 A1 | 9/2009 | Baumgart et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2010/0084476 A1 | 4/2010 | Zellner et al. |
| 2010/0270373 A1 | 10/2010 | Poidomani et al. |
| 2011/0028184 A1 | 2/2011 | Cooper |
| 2016/0027002 A1* | 1/2016 | Choi .................. G06Q 20/3229 705/41 |
| 2016/0267486 A1* | 9/2016 | Mitra .................. G07F 7/0846 |

FOREIGN PATENT DOCUMENTS

| | | |
|---|---|---|
| JP | 05210770 A | 8/1993 |
| WO | WO9852735 | 11/1998 |
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO07141779 | 12/2007 |
| WO | WO08064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Nos. http://homes.cerias.purdue.edu/~jtli/paper/fc07.pdf. As viewed on Apr. 12, 2010.
English translation of JP 05210770 A.

* cited by examiner

PAYMENT DEVICE APPLETS WITH PRE-STORED MESSAGES AND TRIGGERABLE LOGIC

CROSS-REFERENCE TO RELATED APPLICATION

This application claims the benefit of U.S. Provisional Patent Application Nos. 62/911,357, titled "ADVANCED SECURE PAYMENT DEVICE," filed Oct. 6, 2019, 62/927,664, titled "SCALABLE LOYALTY PROCESSING APPARATUSES AND SYSTEMS AND METHODS OF HIGH VOLUME LOYALTY DATA PROCESSING," filed Oct. 29, 2019, 62/934,343, titled "SWITCH CARD OR DEVICE AND SYSTEM WITH MULTIPLE SECURE ELEMENTS," filed Nov. 12, 2019, 62/967,539, titled "SYSTEMS AND METHODS FOR TRANSACTION DETECTION AND TRANSACTION INDICATOR MECHANISMS FOR CARDS AND DEVICES," filed Jan. 29, 2020, and 62/987,276, titled "MULTI-FUNCTION APPLET POWERED CARDS AND OTHER DEVICES," filed Mar. 9, 2020, 62/987,279, titled "MULTI-FUNCTION APPLET POWERED CARDS AND OTHER DEVICES," filed Mar. 9, 2020, and 63/048,073, titled "PAYMENT DEVICE APPLETS WITH PRE-STORED MESSAGES AND TRIGGERABLE LOGIC," filed Jul. 3, 2020, each of which is hereby incorporated by reference herein in its entirety.

BACKGROUND OF THE INVENTION

This invention relates to payment devices and payment systems.

SUMMARY OF THE INVENTION

Payment cards are provided that may be powered interactive payment cards or static payment cards. Interactive cards may have, for example, any number of buttons and/or displays to receive manual input from cardholders and/or display information to cardholders. Batteries may be included in interactive cards to power electronics such as displays and other electrical components in order to provide advanced functionality even when, for example, a card is not under power of an external device (e.g., a point-of-sale terminal). Non-powered and/or non-interactive cards may be provided with advanced capabilities through, for example, the inclusion of advanced payment applets that can trigger different functionalities in different situations. In doing so, the payment application can receive data from a transaction and initiate different capabilities in the same manner than a cardholder can initiate different capabilities. Advanced transaction processing capabilities at the terminal, merchant, merchant processor, payment network, bank, bank processor, or other device may receive data from and/or provide data to payment applets located on powered, non-powered, manually interfacing, and/or non-manually interfacing cards.

A payments applet may be provided, for example, in a processing chip such as a secure processing chip that includes a secure element such as a secure memory element. A processing chip may communicate with a point-of-sale terminal through any number of interfaces such as a contact interface (e.g., contact EMV), a contactless interface (e.g., an RFID antenna, a magnetic communications device, or any type of interface (e.g., a dynamic and/or static QR code or other type of barcode provided through a display). Persons skilled in the art will appreciate that different interfaces may have their own processors and/or secure elements. In this manner, a processor may be coupled to other chips (e.g., processors) that provide different interfaces. For example, a contactless chip may provide a contactless interface and a contact chip may provide a contact interface. Accordingly, a payment applet may be provided in a contact chip and may include contact chip features and a payment applet may be provided in a contactless chip and may include contactless chip features. Additional software (e.g., firmware) may be provided to move data between different components and/or structures of a device. As per another example, a single chip may have an applet that includes multiple interface features such as contact chip features and contactless chip features. Persons skilled in the art will appreciate that different interfaces may have different performance and protocols that take advantage of the capabilities of the differentiating interfaces. For example, a applet may have a faster contactless protocol than a contact applet and, as such, may have the capability of completing a contactless transaction faster than the applet may complete a contact transaction (or vise versa) in certain scenarios.

Applets may include one or more applications and such applications may be prioritized such that a point-of-sale reader may initiate applications that are applicable to that point-of-sale reader in such a prioritization. A card or other device may change the priority of such applications based on input, for example, on the device (e.g., a manual input on a manual input interface such as a button on a battery powered card). The applet may change priorities alternatively, for example, based on pre-determined prioritizations based on data that is learned by the applet during one or more than one transaction. In general, payment applets are provided that may store in a secure element or other structure some or all data that is introduced to a payment applet after a payment applet is utilized to make a purchase transaction. The applet may utilize the received data to make determinations that may change the operation of the applet temporarily, permanently, and/or conditionally. For example, a payment applet may receive data associated with the country that the card was utilized in for a transaction. The payment applet may reset a transaction and utilize the information in the subsequent approved transaction or, for example, the applet may permit the transaction to complete and utilize the information in the subsequent transaction. For example, a card may have different payment card numbers associated with different countries and each payment card number may carry different economics (e.g., interchange and/or assessment fees) based on the country where the card number is utilized. Accordingly, for example, a device may change the payment card number based on the country where the card is located in order to provide improved economics (e.g., interchange and/or assessment fees). The device may, for example, change a default parameter (e.g., payment account number) based on one transaction or receiving the same data (e.g., same country) for a number of transactions (e.g., for 2, 3, 4, 5, or more than 5 transactions).

Persons skilled in the art will appreciate that different applications may be provided, for example, in an applet for different payment networks. Accordingly, for example, an applet may receive manual input (e.g., from a button on the device or information associated with a button press on an external device such as a mobile phone) that may cause the applet to initiate an application or prioritize an application associated with a particular account (e.g., a personal account) of a particular payment product (e.g., a credit card) of a particular network (e.g., Mastercard, Visa, Mastercard, JCB, UPI, etc.). Similarly, manual input may select a different account (e.g., personal account or business account) or a different option (e.g., pay with points, pay with installments such as a 3 month, 6 month, 12 month, 18 month, 24 month, 36 month or 48 month installment, etc.).

Accordingly, for example, a cardholder may on the device that includes the applet (e.g., a powered card) or another device (e.g., a mobile phone associated with the cardholder) select a payment network, payment product, payment account, and/or payment option and provide information associated with this selection to the applet. This may be done via a direct electrical coupling on the device between the button and the applet. Alternatively, for example, this may be done remotely during a transaction by providing data to the applet associated with the selection (e.g., during contact EMV scripting and/or during contactless EMV scripting).

Accordingly, for example, a device (e.g., a telephonic payment device or card) may be utilized at a point of sale in a purchase transaction to purchase an item. The devices may be utilized, for example, to make a contact or contactless transaction. An applet on the device may be utilized to manage the transaction flow between the device and the point of sale terminal. During the transaction process, the device may manage the transaction for a first payment card account (e.g., a debit account) and that first payment card account may be associated with the country of payment account issuance (e.g., the United States). During the transaction process, the applet may learn that the transaction is occurring in the United States from data received from the point of sale device during the payment transaction. The applet may be structured to recognize the country and perform different activities based on the recognized country. For example, if the country recognized matches the country of issuance then the applet may ensure that a transaction only completes if the payment account for the transaction matches the payment account the applet recognizes is to be utilized for the recognized country. Thus, an applet may be set so that a particular account (e.g., debit) it utilized when the device is in the country of issuance and that a different account (e.g., a pre-paid account such as a foreign exchange pre-paid account) is utilized when the device is not in the country of issuance. If the recognized country matches the payment card account desired for that country then the apple may permit the transaction to complete. If the recognized country does not match the payment card account desired then the payment applet may attempt to change the account of the transaction or may terminate the transaction without the transaction successfully completing. This may be done, for example, by the card not proving a confirmation or acknowledgement of a transaction approval. Persons skilled in the art will appreciate that a device may include numerous steps of bi-directional communication to a point-of-sale device and the point-of-sale-device may include multiple steps of communication data bi-directionally to the merchant bank, payment network, issuer, issuing bank processor, and/or a variety of additional processing or other elements. By shutting down a transaction, the payment applet may then attempt to re-initiate a transaction with the payment account for the previously recognized country. The payment applet may change the account utilized in a payment transaction in order to, for example, increase the chance that the applet does not have to restart by assuming, for example, that at least a number of subsequent transactions will occur in the same country as the previously detected country. Persons skilled in the art will appreciate that a payment applet may not be able to restart a transaction and that the device holder may have to dis-engage the device from the point-of-sale reader and re-engage with the point-of-sale reader. As such, for example, a cardholder may have to remove a card from an EMV terminal the first time a cardholder enters a country and reinsert the card into the EMV terminal each time a cardholder enters a country. Alternatively, for example, a card may wait for a number of transactions (e.g., 2 transactions) that are associated with an account change before making the account change for future transactions. Accordingly, if for example, a cardholder is using a virtual card on a mobile phone and enters a country, that cardholder may, if the payment applet cannot re-initiate a transaction itself, find themselves dis-engaging from a reader on two consecutive occasions if the device is set to change the account used initially for a transaction only after two changes are detected. Persons skilled in the art will appreciate that a card may include program logic for pre-dicting situations and pre-emptively changing accounts (or other features) based on those predictions. Person skilled in the art will appreciate that different accounts, options, or other features may be deployed by a payment applet on a device (e.g., a card or a mobile telephonic device) for different countries, groups of countries, country of issuance, countries outside the country of issuance, etc. Accordingly, for example, a payment device may change to a U.S. payment card when in the U.S., a French payment when in France, a German payment card when in Germany, and may default to an international foreign exchange card (e.g., a foreign exchange pre-paid card) if the device does not have a territory-specific account for a particular country or territory.

External information may be sent to a payment applet during a transaction in order to update the payment applet. For example, a mobile telephonic device may determine the location of the mobile telephonic device and may communicate information to a remote server. The remote server, in turn, may be reviewed by a processing system, for example, to see if any updates occurred during a payment transaction with a device and updates may be provided to the payment applet of the device undergoing the payment transaction during a payment transaction. Accordingly, for example, the country may be updated by an external device. Any type of information may be downloaded such as, for example, any setting or updated to program logic. For example, a setting as to whether the country should be changed for a current transaction or if the change (e.g., terminate and re-initiate a transaction) or if the change should wait until the next transaction (e.g., let the current transaction be approved and complete the transaction before changing the setting). Person skilled in the art will appreciate that the payment device may have its own wireless connection (e.g., cellular connection, Bluetooth connection, etc.) and may receive updates from this connection before, during, and/or after a payment transaction. Similarly, a payment device may communicate with an external non-point of sale device directly (e.g., a card may communicate with a mobile phone via a Bluetooth or other wireless connection). Non-wireless connections may also be utilized (e.g., a device may have an EMV slot and may electronically couple to a card via that EMV slot). Persons skilled in the art will appreciate that updates made to a payment applet may be also made to other communication systems such as, for example, dynamic barcode systems (e.g., dynamic QR systems) as well as dynamic magnetic stripe communications systems. Accordingly, the device may change the account on its magnetic stripe as well as displayed QR payment information in addition to its contact and contactless payment information.

Persons skilled in the art will also appreciate that an applet may be generally considered, for example, all software/firmware in a device that is utilized to complete a purchase transaction or may be considered individual applets running on individual environments. For example, a device may have an applet that runs on a first operating system to perform a first set of functions (e.g., Visa EMV contactless) and a second applet that runs on a second operating system to perform a second set of functions (e.g., QR code). Intermediary software/firmware as well as intermediary hardware (e.g., processor(s)) may be utilized to share information and/or controls between applets and/or other hardware and/or software/firmware portions of a device.

A payment applet on a device may receive time as part of a transaction process. Accordingly, the device may be utilize the time of a transaction in determining, for example, an account to utilize or a payment option or other metric to utilize. The device may, for example, utilize the time also to update a time tracking device such as a timer/counter. In doing so, for example, the card may be able to determine the time of a transaction before a transaction process starts. Accordingly, for example, a card may be able to predict when the day changes. A first account may be utilized, for example, for a first period of time and a second account may be utilized for a second period of time. For example, when a card is issued (e.g., a virtual and/or physical card) a first card account may be utilized for a period of time (e.g., the first 72 hours) and a second card account may be utilized for a second period of time (e.g., after the first 72 hours). In doing so, for example, additional security may be provided so if a card is compromised in the mail the relevancy of the card compromise may be reduced. Furthermore, for example, a debit or pre-paid card may be the card for the first period of time (e.g., first 5 days) and then the card may be switched over to a different product such as a credit account for a credit product. In doing so, for example, a card may be instantly issued to a consumer while a credit setup process is being performed that may, for example, determine the credit limit and/or other metrics associated with the credit card.

A payment applet may receive the date of a transaction in addition to the time. A device may utilize this date information in the current transaction and/or subsequent transactions. For example, in countries that have heightened levels of inflation, it may be beneficial for a cardholder (e.g., a physical card or a virtual card on a mobile device) to be issued a card that utilizes a different account over different portions of a month. For example, a first account may be utilized on the first half of the moth (e.g., beginning of the month to the end of the 15th of the month) and a second account may be utilized on the second half of the money (e.g., starting on the 16th of the month to the end of the month). In doing so, a cardholder may have two different payment dates—one associated with the first account at a first time and one associated with a second account at a second time. In doing so, the card may automatically recognize the date during a transaction and terminate the transaction if the account associated with that date is not being utilized so that another transaction may be started with that account utilized by the payment applet. Persons skilled in the art will appreciate that recognized time by the device may be utilized in conjunction with the recognized date and a timing circuit in order to predict when a new period starts so that the appropriate account can be utilized in a point-of-sale terminal when a transaction is made in that period. In a country where an annual interest rate is over two hundred percent, for example, a cardholder may be provide with material economic value for a card that provides a longer time for a payment to be due by having multiple payment periods. A card may switch between two, three, four, five or more accounts in order to provide a cardholder with two, three, four, five or more, respectively, credit payment periods. The different accounts may have a shared credit line and/or may have different credit lines.

The value of a transaction may be utilized, for example, as a switching mechanism in a payment applet to switch between accounts, options, and or other payment features. For example, a transaction associated with an amount larger than a particular amount (e.g., $100, $500, or $1000) may be switched from a first account (e.g., a debit account) to a second account (e.g., a credit account). A payment applet may alternatively, for example, switch a transaction from a first option (e.g., a credit option on a credit account) to a second option (e.g., an installment option on a credit account. Persons skilled in the art will appreciate that information associated with different options (e.g., pay with points, pay with various installment periods) may be embedded into payment data (e.g., a pan sequence number, magnetic stripe discretionary data, etc.). Accordingly, for example, a payment applet may determine to embed payment option data (e.g., installment data) in to payment information in a particular scenario or set of scenarios. This payment information may then be communicated through a payment network to an issuing bank's processor. An issuing bank's processor may authorize the transaction. After authorization, for example, the payment option data may be extracted (e.g., from a copy of the authorization message) and may be utilize do initiate an additional transaction such as a statement credit/offset (e.g., for a pay with points) or a statement credit/offset with monthly equated statement charges and/or additional monthly fees over a number of months (e.g., for an equated monthly installment over those number of months). A statement offset may be provided, for example, via a monetary file transfer between two different accounts. One account, for example, may be an escrow and another account may be the account associated with the payment device for the transaction. Accordingly, a $60 credit transaction may be offset by a $60 transfer. The description of the offset transaction may be, for example, associated with the feature. Accordingly, the description may state "Toys R Us 6/26 for $60 offset with 6 month EMI" and then each month a $10 installment may be applied with the description "Toys R Us 6/26 Installment X of 6" where X is the month installment of the 6 months of installments. A fee may be added (e.g., a percentage or fixed fee) to the aforementioned amount (e.g. $2 to make the installment $12) or a second line statement may be provided in the statement for the fee (e.g., a second statement line of $2). Payment options may also be selected by a manual interface on a device or a manual interface on a remote device that is then communicated to the transacting device (e.g., via a wireless communication or through transaction data delivered to the transacting device from the point-of-sale terminal).

A payment applet may combine data from multiple transactions and utilize this combined data to make determinations on accounts, options, applications, or other attributes to utilize in a payment transaction. Cumulative data such as cumulative transaction amounts may be utilized to determine the amount spent on the payment device over, for example, a period of time, for example, on a particular type of payment (e.g., payment transactions with bi-directional data flow). Accordingly, for example, an account (e.g., a debit account) may be utilized until a particular amount of transaction volume occurs (e.g., $1,000) during a period of time (e.g., each month) and a second account (e.g., a credit account) may be utilized after that until the end of the month. Alternatively, for example, credit may be utilized during each month until a transaction amount is reached and then an installment option may be utilized. In doing so, for example, a payment device (e.g., a static, non-interactive card) may be able to change accounts and/or payment options based on pre-determined conditions. Persons skilled in the art will appreciate that information may be sent to a device to, for example, update pre-determined conditions to other conditions (e.g., change the cumulative amount to cause a change in an account and/or option to a different cumulative amount as well as the account and/or option changed). Accordingly, updates to one or more payment applets or other software/firmware parts of a device may be updated during a transaction (e.g., through transaction information or at any time (e.g., through a wireless communication by a wireless communication communications device on the device).

A device may utilize (e.g., via a payment applet) an approval and/or a cumulative number of approvals and/or additional transaction data to initiate a feature. For example, a pre-stored message may be displayed on a display (e.g., an bi-stable display, non bi-stable display, and/or a display of individual light emitting diodes LEDs or other sources of light) for a particular transaction approval (e.g., first transaction) particular group of transaction approvals (e.g., first 10 transactions) and/or all transactions approvals of a particular type (e.g., first transaction approval after a new year). Accordingly, for example, a welcome message may be provided to a cardholder for the first one, two, or more than two transaction approvals. The number of transaction approvals may also be utilized, for example, to provide a game of chance and/or a sweepstakes. For example, a prize may be randomly hidden in each payment account (e.g., a prize of a free transaction or a discount on a transaction) and a message may be displayed to a cardholder indicative of whether or not a transaction approval was a winning transaction approval and the prize associated with that winning approval. Persons skilled in the art will appreciate that prizes may be distributed over a number of cards randomly such that, for example, multiple prizes may be provided on some cards and no prizes may be provide on other cards. Prizes may be randomly assigned transaction approvals (e.g., 72nd transaction approval) in a range of transaction approvals for a card (e.g., transaction approvals between 1 and 500).

A mobile device may have a mobile wallet with a virtual card that corresponds to a physical card. A cardholder may select different accounts and/or options on the virtual card. This selection information may be stored on, for example, a remote server and delivered to a transacting device (e.g., a static, non-interactive card) during a transaction. A payment applet on the static-non-interactive card may determine whether or not to terminate a payment transaction based on the received information and change the account and/or option as desired by the cardholder and re-initiate the transaction.

Persons skilled in the art will appreciate that physical payment cards may be loaded as virtual cards into a virtual wallet of a mobile device (e.g., a mobile telephonic device). A user may, for example, browse different virtual cards in the virtual wallet and utilize those cards for online transactions (e.g., by reading a displayed card number) and/or an in-store transaction (e.g., by initiating a contactless transaction between the mobile telephonic device and a contactless point-of-sale terminal). Persons skilled in the art will appreciate that cards with interactive buttons and cards without interactive buttons may either or both be loaded into virtual wallets and receive virtual buttons to perform additional functionalities (e.g., the same functionalities on physical buttons of physical interactive cards). Accordingly, for example, a mobile wallet may be provided in which some virtual cards (e.g., those that correspond to physical interactive cards), some virtual cards (e.g., cards associated with a particular network, and/or virtual cards of a particular type (e.g., all credit cards) and/or all virtual cards may be provided with interactive features when they are digitized and uploaded into a virtual wallet. Persons skilled in the art will appreciate that a virtual wallet may be provided on a website and retrieved after a user logs into the website and identified themselves and is completing a purchase transaction. A virtual wallet may alternatively be provided on a device such as, for example, a watch, phone, or a card. Such devices may have wireless communication capabilities (e.g., cellular capabilities) to communicate data (e.g., virtual card data).

Accordingly, for example, a non-interactive card with no buttons may be loaded into a wallet and the virtual card may have a virtual button associated with point redemption and one or more virtual buttons associated with one or more installment options (e.g., 6-month, 12-month, 18-month, and/or 24-month installments). The virtual card may have a virtual button for one or more accounts (e.g., one or more debit, credit, and/or pre-paid accounts). Additionally, for example, an interactive card with one or more payment account buttons (e.g., credit, debit, and/or pre-paid), installment buttons, and reward buttons may be loaded into one or more virtual wallets as a virtual card that has one, more than one, or all of the buttons of the physical card as virtual buttons on the virtual card. Thus, for example, an issuing bank may provide a virtual wallet where any card from that bank may be loaded into the virtual wallet and virtual buttons may be added to all of the cards for additional features not present on the physical cards (e.g., unless the physical cards are interactive cards). Additional features may be added as virtual buttons to all or some of an issuing bank's virtual cards after the card has been digitized/virtualized and put in the virtual wallet. Accordingly, for example, the functionality of a virtual card may be updated as new features are deployed.

Persons skilled in the art will appreciate that multiple processes may be utilized to load a physical card into a virtual wallet as a virtual card. For example, the personalization data associated with a card may be utilized to fulfill a virtual card. As per another example, a physical card may be recognized at a remote server and a virtual card, such as a payment account token, may be generated and provided to a device. Host card emulation processes, for example, may be utilized.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
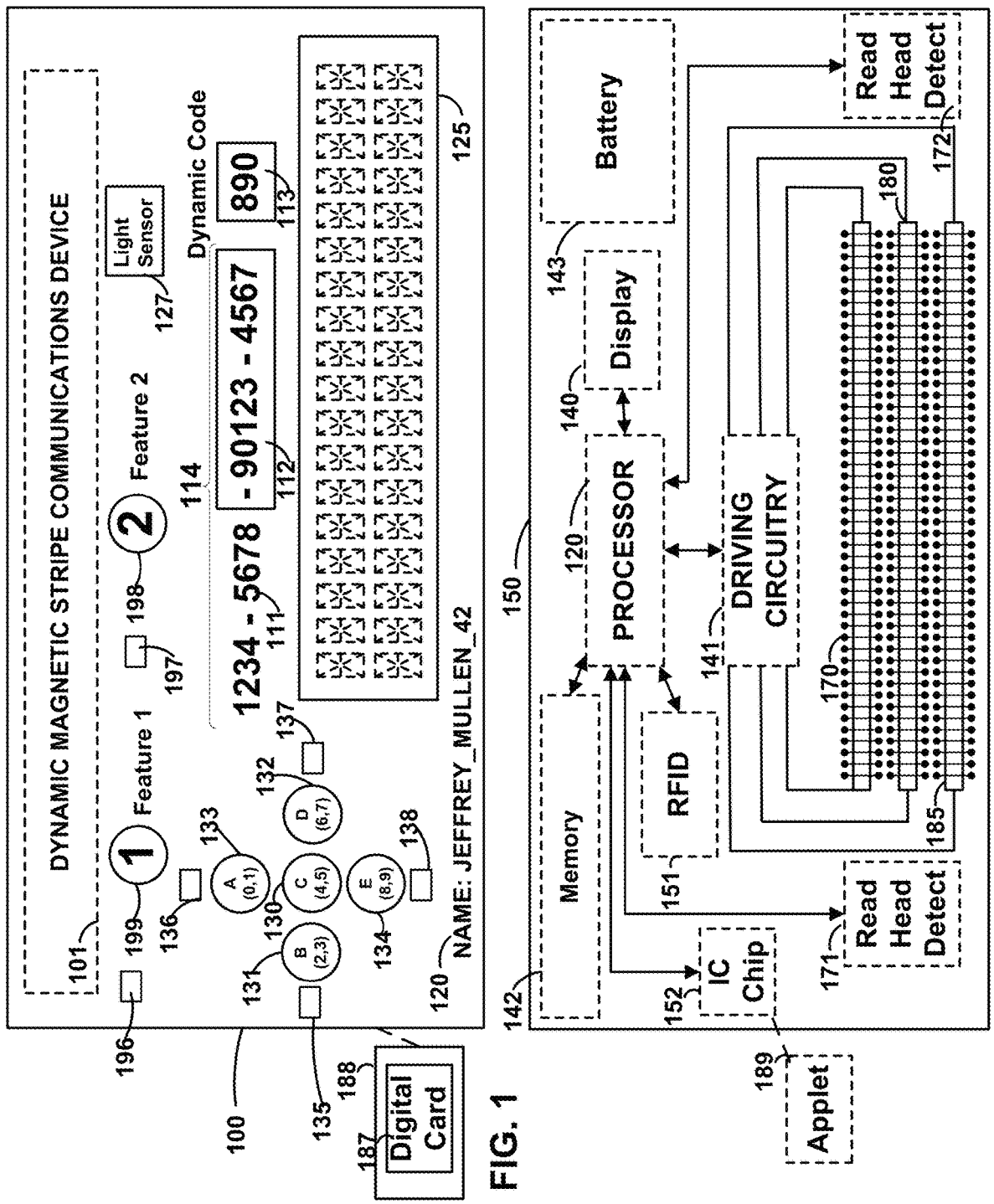
FIG. 1 is an illustration of a card and architecture constructed in accordance with the principles of the present invention.

FIG. 1 shows card 100 that may include, for example, dynamic magnetic stripe communications device 101, one or more displays (e.g., displays 112, 113 and 125), permanent information 120, light sensor 127, one or more buttons (e.g., buttons 130-134, 198 and 199), lights 135-138, 196 and 197, and dynamic number 114 which may include a permanent portion 111. Permanent portion 111 may be, for example, printed, embossed and/or laser etched on card 100.

Multiple displays may be provided on card 100 for various purposes. For example, display 112 may display a dynamic number entirely, and/or partially. Display 113 may be utilized to display a dynamic code (e.g., a dynamic security code). Display 125 may display logos, barcodes, and/or one or more lines of information (e.g., may display a coupon code). A display (e.g., at least one of displays 112, 113 and 125) may be a bi-stable display or non bi-stable display. A bi-stable display may be a display that maintains an image without power.

Card 100 may include permanent information 120 including, for example, information specific to a user (e.g., a user's name and/or username) and/or information specific to a card (e.g., a card issue date and/or a card expiration date).

Card 100 may include a dynamic magnetic communications device. Such a dynamic magnetic communications device may take the form of a magnetic encoder and/or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

Card 100 may include one or more buttons, for example, buttons 130-134, 198 and 199. Buttons 130-134, 198 and 199 may be, for example, mechanical buttons, capacitive buttons, light sensors and/or a combination thereof.

Button 199 may be used, for example, to communicate information through dynamic magnetic stripe communications device 101 indicative of a user's desire to communicate a single track of magnetic stripe information. Persons skilled in the art will appreciate that pressing a button (e.g., button 199) may cause information to be communicated through device 101 when an associated read-head detector detects the presence of a read-head of a magnetic stripe reader and/or at a specific frequency. Button 198 may be utilized to communicate (e.g., after button 198 is pressed and after a read-head detects a read-head of a reader) information indicative of a user selection (e.g., to communicate two tracks of magnetic stripe data). Multiple buttons may be provided on a card and each button may be associated with a different user selection.

Different third party features may be, for example, associated with different buttons and a particular feature may be selected by pressing an associated button. According to at least one example embodiment, button 198 and button 199 may each be associated with, for example, a different third party service provider feature (e.g., an application facilitating a coupon) and may be changed by a user at any time.

According to some example embodiments, a user may select a third party feature from a list displayed to the user. For example, the user may scroll through a list of features on a display (e.g., display 125). A user may scroll through a list using buttons on a card (e.g., buttons 130-134). The list of features may be displayed to the user individually, in groups and/or all features may be simultaneously displayed.

According to some example embodiments, a third party feature associated with a button may be changed by a user, for example, on a graphical user interface (GUI) provided by a device provider, ecosystem provider, application manager provider, remote facility provider, card issuer, processor, and/or any other entity (which may be the same or different entities). For example, an ecosystem provider may, on its website and/or via an application, allow a user to change the third party feature performed when the third party's feature button is selected by a user on the user's card or other device.

A third party service provider may provide a reward (e.g., a coupon) from a collection of rewards based on, for example, one or more card transactions. The fact the user has received the reward may be presented on a profile page of the user. When a transaction is performed, a user's profile may be updated to state that the user has earned a reward and the user may receive the reward (e.g., via email). A user may be provided with a GUI, for example, a GUI on a mobile telephonic device of the user, when the user makes a purchase, to identify and/or use the reward earned by the user.

The selection of a feature may or may not have a cost associated with it. If a cost is associated with the feature, for example, the cost may be added to a customer's statement (e.g., added to a credit or debit purchase) for a particular transaction. A fixed-fee or variable-fee (e.g., a percentage of the transaction) may then be removed from the fee charged to the user and distributed among particular parties (e.g., distributed to the card issuer, application manager provider, ecosystem provider, device provider and/or other entity). The remainder of the fee, if any, may be provided, for example, to the third party service provider.

A cost may be associated to a feature selection, but may not be a cost to a user. For example, the cost may be a cost to a third party service provider (e.g., an incentive). The cost may be a cost to other entities, for example, the device provider, card issuer, card processor (which may be the same, for example, as the card issuer), and/or any other entity (e.g., card network).

According to some example embodiments, a user may select a type of payment on card 100 via manual input interfaces (e.g., buttons 130-134). The manual input interfaces may correspond to displayed options (e.g., displayed on display 125). Selected information may be communicated to a magnetic stripe reader via a dynamic magnetic stripe communications device. Selected information may also be communicated to a device (e.g., a mobile telephonic device) including a capacitive sensor and/or other type of touch sensitive sensor.

Lights 135-138, 196 and 197 (e.g., light emitting diodes), may be associated with buttons 131-134, 198 and 199. Each of lights 135-138, 196 and 197 may indicate, for example, when a button is pressed. In a case where a button may activate card 100 for communications, a light may begin blinking to indicate card 100 is still active (e.g., for a period of time) while reducing power expenditure. Although not shown, a light may be provided for button 130.

Card 100 may include light sensor 127. Light sensor 127 may, for example, receive information from a light source (e.g., a display of a mobile telephonic device and/or a laptop computer). Card 100 may include, for example, any number of light sensors 127. Light sensor 127 may be utilized such that a display screen, or other light emitting device, may communicate information to light sensors 127 via light. Display 125 may allow a user to select (e.g., via buttons) options on display 125 that instruct the card to communicate (e.g., via a dynamic magnetic stripe communications device, RFID and/or exposed IC chip) to use a debit account, credit account, pre-paid account, and/or point account for a payment transaction.

Card 100 may, for example, be loaded into device 188, which may be a portable device such as a portable telephonic device (e.g., a watch, mobile phone, automobile, etc.). Card 100 may be loaded into device 188 as digital card 187. Digital card 187 may have, for example, none of the features of card 100, a portion of the features of card 100, all of the features of card 100, and may include additional features not provided in card 100. Accordingly, for example, digital card 187 may include digital buttons that correspond to physical buttons on card 100 and/or digital displays that correspond to physical displays of card 100. Device 188 may include any number of communication devices to communicate, for example, to any device such as a remote server, a card, a payment device (e.g., watch, mobile phone, card), point-of-sale system, etc. Accordingly, device 188 may include Bluetooth, one or more cellular modems, magnetic stripe communication devices, contact communication devices, contactless communication devices, or any other type of communication technology (e.g., communication technology of card 100). One, two, three, four, or more than four cards may be loaded into device 188. All, or portion of the cards, that are digitized/virtualize may have virtual buttons added to the cards even if the physical cards do not have physical buttons. For example, one, two, three, four, or more than four virtual buttons may be added to one, more than one, or all cards that are digitized virtualized for a particular bank or for any bank. Digital card 187 may, for example, be loaded into a wallet that is branded to a bank issuer associated with digital card 187. Such a mobile wallet may be an executable program (e.g., an application) and may be able to load only cards from the same issuing bank or cards from multiple issuing banks. Digital cards may be loaded into a mobile wallet of a device without, for example, an underlying physical card. Such a digital card may be delivered from a remote server. Such a remote server may receive a request to create a digital card (e.g., from an issuing bank or from a consumer) and card personalization data may be delivered to the mobile wallet. A digital card may, for example, display one or more payment card numbers or may display no payment card numbers. A personal identification code may be requested in order for a digital (or physical) card to be utilized at a point-of-sale and/or to have one or more payment card account numbers displayed (e.g., for an online or over-the-phone transaction).

Architecture 150 may be utilized with any card (e.g., any card 100). Architecture 150 may include, for example, processor 120, display 140, driving circuitry 141, memory 142, battery 143, radio frequency identification (RFID) 151, integrated circuit (IC) chip 152, electromagnetic field generators 170, 180, and 185, and read-head detectors 171 and 172.

Processor 120 may be any type of processing device, for example, a central processing unit (CPU) and/or a digital signal processor (DSP). Processor 120 may be, for example, an application specific integrated circuit (ASIC). Processor 120 may include on-board memory for storing information (e.g., triggering code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120.

Memory 142 may be coupled to processor 120. Memory 142 may store data, for example, data that is unique to a particular card. Memory 142 may store any type of data. For example, memory 142 may store discretionary data codes associated with buttons of a card (e.g., card 100 of FIG. 1). Discretionary data codes may be recognized by remote servers to effect particular actions. For example, a discretionary data code may be stored in memory 142 and may be used to cause a third party service feature to be performed by a remote server (e.g., a remote server coupled to a third party service such as a coupon provider). Memory 142 may store firmware that, for example, controls triggering and/or the like.

Architecture 150 may include any number of reader communication devices. For example, architecture 150 may include at least one of IC chip 152, RFID 151 and a magnetic stripe communications device. IC chip 152 may be used to communicate information to an IC chip reader (not illustrated). IC chip 152 may be, for example, an EMV chip. RFID 151 may be used to communicate information to an RFID reader. RFID 151 may be, for example, an RFID tag. A magnetic stripe communications device may be included to communicate information to a magnetic stripe reader. For example, a magnetic stripe communications device may provide electromagnetic signals to a magnetic stripe reader.

Different electromagnetic signals may be communicated to a magnetic stripe reader to provide different tracks of data. For example, architecture 150 may include electromagnetic field generators 170, 180, and 185 to communicate separate tracks of information to a magnetic stripe reader. Electromagnetic field generators 170, 180, and 185 may include a coil (e.g., each may include a coil) wrapped around one or more materials (e.g., a soft-magnetic material and a non-magnetic material). Each electromagnetic field generator may communicate information, for example, serially to a receiver of a magnetic stripe reader for a particular magnetic stripe track. According to at least one example embodiment, a single coil may communicate multiple tracks of data.

Architecture 150 may include read head detectors 171 and 172. Read-head detectors 171 and 172 may be configured to sense the presence of a magnetic stripe reader (e.g., a read-head housing of a magnetic stripe reader). Information sensed by the read-head detectors 171 and 172 may be communicated to processor 120 to cause processor 120 to communicate information serially from electromagnetic generators 170, 180, and 185 to magnetic stripe track receivers in a read-head housing of a magnetic stripe reader.

According to at least one example embodiment, a magnetic stripe communications device may change the information communicated to a magnetic stripe reader at any time. Processor 120 may, for example, communicate user-specific and card-specific information through RFID 151, IC chip 152, and/or electromagnetic generators 170, 180, and 185 to card readers coupled to remote information processing servers (e.g., purchase authorization servers). Driving circuitry 141 may be utilized by processor 120, for example, to control electromagnetic generators 170, 180 and 185.

Architecture 150 may include, for example, a light sensor. Architecture 150 may receive information from a light sensor. Processor 120 may determine information received by a light sensor.

One or more payment applets may be, for example, run by any circuit and/or chip of card 150. Any applet on card 150 may be, for example, an applet on device 188 or associated with virtual card 187. Persons skilled in the art will appreciate that one or more payment applets may be pre-loaded into a card or other device or loaded into a card or other device after the card is issued to a cardholder. A payment applet may, for example, include software/firmware for any number of payment networks and may be updated at any time (e.g., at the direction of an issuing bank, payment network, administrator, cardholder etc.). Persons skilled in the art will appreciate that an applet may be provided with multiple applications such as, for example, applications for each payment network for a contact chip as well as a contact chip or other communication protocols. An applet may, for example, run off an operating system. Each chip may have a different operating system and each chip may have a different applet. Persons skilled in the art will appreciate that any physical button on a physical card or a virtual button on a virtual card may be included as a feature in a payment applet that is triggered based on pre-determined and/or adaptive determinations based on, at least in part, for example, transaction data (e.g., previous transaction data and/or current transaction data). A payment applet may utilize past and/or present data to provide predictive decisions and trigger features (e.g., switch payment accounts) based on such predictive decisions.

For example, an applet that provides transaction protocols for a device through both contact and contactless communication devices may recognize that the devices first transaction occurred (e.g., a contact transaction) and may display a pre-determined and pre-stored message on a display (e.g., "Welcome cardholder to bank" where bank may be personalized to the name of the bank and cardholder may be personalized to the first name or full name of the cardholder. The applet may then repeat that message for a number of transaction approvals (e.g., 1, 2, 3, 4, 5, or more than 5) regardless if the transaction is a contactless transaction or contactless transactions. The applet may, for example, also determine the country of a transaction utilizing country information (e.g., CDOL/PDOL country information) and may determine whether or not a payment card account number needs to be changed (e.g., based on pre-determined associations of card accounts to countries). The device may then cause a transaction to not be completed (e.g., not acknowledge an approval message sent to the device) and the device may change the payment account utilized for the next transaction). The applet may leave this payment account number until, for example, the country changes and then the applet may determine whether or not a payment account change is applicable to the recognized country and, if so, change the account for that transaction (e.g., shut down and restart a transaction with the new payment account number).

A single chip may have, for example, a single operating system and a single payment applet and multiple communication interfaces may be coupled to this chip such as, for example, a contactless antenna for contactless transaction and a contact interface for contact transactions. A processor, for example, may provide control signals to an applet or other structures of a card or a device to, for example, change payment accounts, features, and/or applets utilized on the components. Similarly, for example, payment transaction applets may communicate with other structures on a card or other device to, for example, initiate functionality such as, for example, pre-stored messages, light source operation (e.g., display images on LEDs and/or display animations using LED) or to utilize components of architecture 150.

Figure 2:
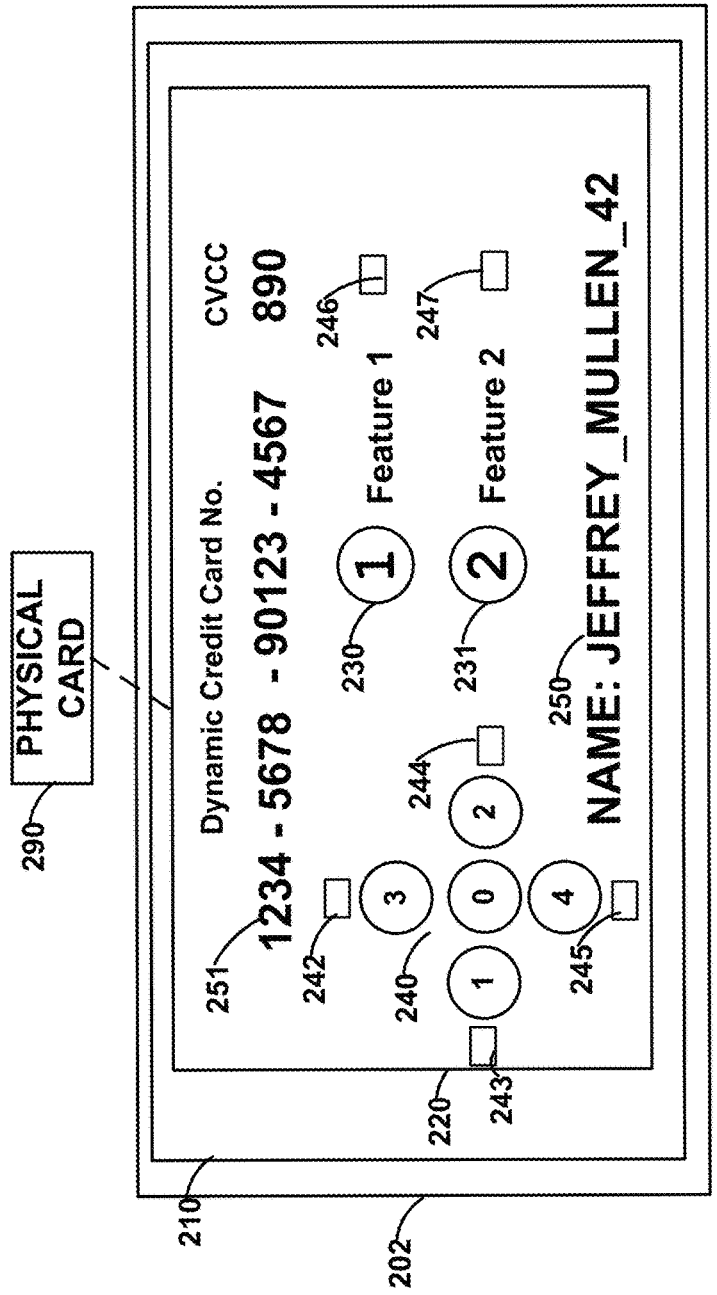
FIG. 2 is an illustration of a device constructed in accordance with the principles of the present invention.

FIG. 2 shows device 200 that may be, for example, a mobile telephonic device and/or other device (e.g., portable computer such as a portable tablet computer). Device 200 may include, for example, housing 202, display 210, device card 220, virtual buttons 230, 231 and 240, virtual lights 242-247, dynamic card number and verification code 245, and identification information 250.

Display 210 may include, for example, light-sensitive and/or touch-sensitive elements. Device 200 may communicate information to a card reader, for example, via a contactless signal (e.g., an RFID signal) and/or a contact-based signal (e.g., a USB connection).

Device 200 may include a device card 220 and/or virtual buttons 230 and 231. Device card 220 may be a virtual representation of a card and/or any information identifying a payment method (e.g., credit account number). A person skilled in the art will appreciate that any physical card described herein may be provided as a device card on, for example, a computing system (e.g., a mobile telephonic device and/or a computer). Physical buttons of a physical card may, for example, correspond to virtual buttons of a device card.

Virtual button 230 may, for example, correspond to one feature (e.g., an opportunity to earn a coupon) from a third party service provider while virtual button 231 may, for example, correspond to another feature (e.g., the opportunity to add value to a coupon) from the same or a different third party service provider. According to at least one example embodiment, every feature may not be provided by a third party service provider. Persons skilled in the art will appreciate that, for example, the device provider may provide features.

All features for a card may be utilized with a particular payment account (e.g., a credit account) such that a payment transaction with that payment account is performed if any feature is selected. As another example, one or more features may be associated with a payment account (e.g., a credit account) while an additional one or more features may be associated with a different payment account (e.g., a debit account). Accordingly, a selected feature associated with a credit account may be utilized to make a purchase with credit and may perform an additional action associated with that feature. A different selected feature associated with a debit account may be utilized to make a purchase with debit and may perform an additional action associated with that different feature.

Device 200 may include virtual lights 242-247. Virtual lights 242-247 may, for example, indicate an active period during which device 200 may communicate with external devices. Virtual lights 242-247 may correspond to, for example, virtual buttons 230, 231 and 240. According to example embodiments, a fewer or greater number of virtual lights are contemplated (e.g., a center button of virtual buttons 240 may virtually light up).

Card number 251 may be a static card number for virtual card 220 or, for example, may be dynamic and may change at every use. Additionally, for example, card number 251 may be changed to another card number based on information received during a payment transaction. Persons skilled in the art will appreciate that as a payment card number changes, for example, so may the payment cards security code (e.g., CVV and/or CVC) as well as other metrics (e.g., expiration date. Physical card 290 may be, for example, a physical representation of any structures and/or feature of virtual card 220 (e.g., a majority of the features of card 220). Persons skilled in the art will appreciate that a payment applet may be different from device to device such as, for example, provided to operate on a particular operating system of a particular device. A chip on a card may, for example, utilize a different operating system than a chip on a portable telephonic device.

Figure 3:
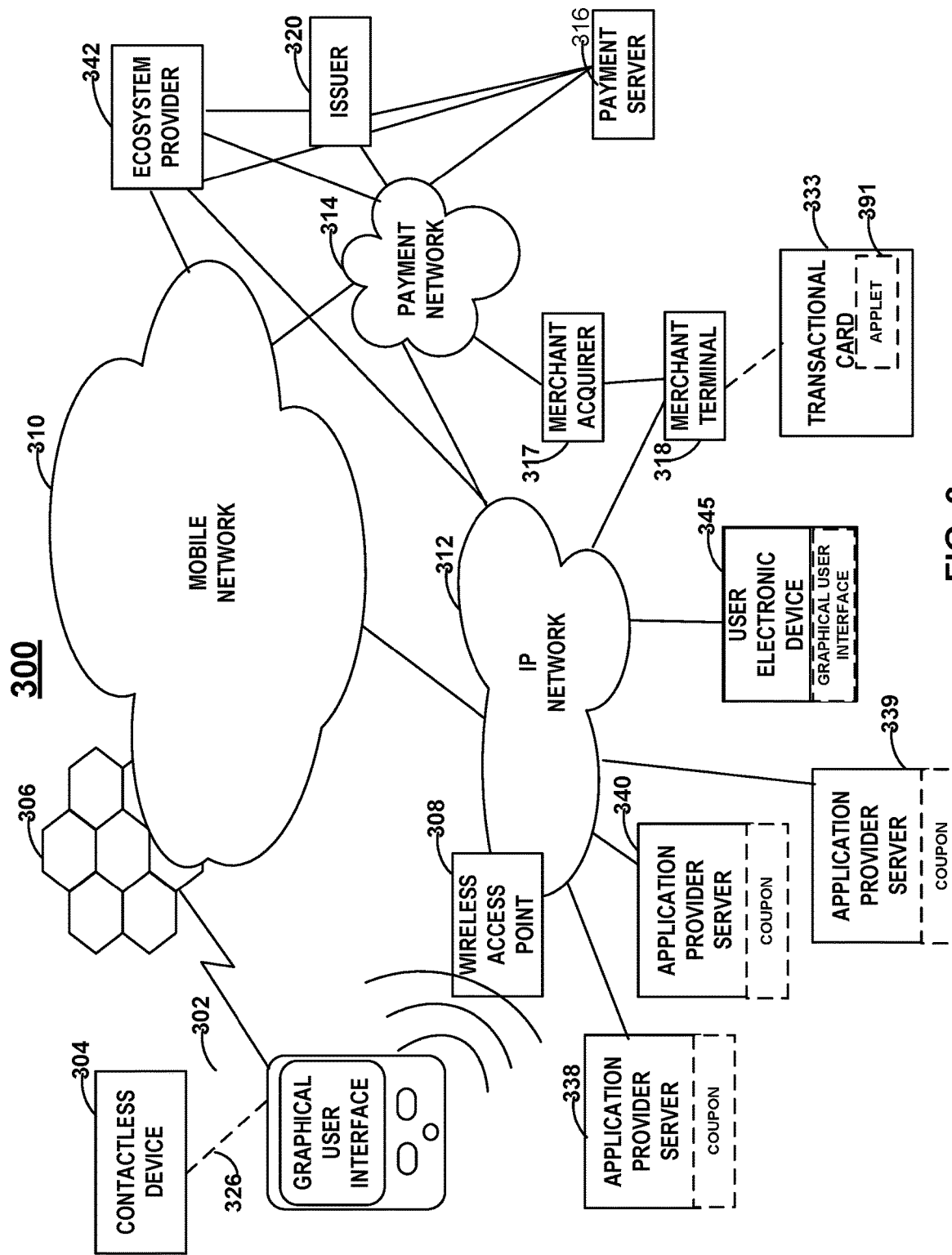
FIG. 3 is an illustration of a network topology constructed in accordance with the principles of the present invention.

FIG. 3 shows network topology 300 that may include, for example, mobile device 302, contactless device 304, cellular network access infrastructure 306, mobile network 310, wireless access point 308, IP network 312, payment network 314, issuer 320, payment server 316, merchant acquirer 317, ecosystem provider 342, merchant terminal 318, transaction card 333, user electronic device 345 and/or application providers 338, 339 and 340.

Mobile device 302 (e.g., a mobile telephonic device, a PDA, an electronic tablet, a laptop, a GPS unit, and/or an MP3 player) may include, for example, a contactless interface that may initiate, sustain, and/or terminate communication channel 326 between contactless device 304 (e.g., a powered card, non-powered card and/or a device) and mobile device 302. Contactless device 304 and mobile device 302 may communicate via channel 326 using any number of contactless mediums, which may include for example, visible, audible, capacitive, electromagnetic, magnetic, and/or RF mediums.

Mobile device 302 may provide one or more transceivers, receivers and/or transmitters that may communicate with one or more wired networks (e.g., IP network 312 and/or payment network 314) and/or one or more wireless networks (e.g., a mobile network 310). Mobile device 302 may, for example, communicate with a cellular station over a wireless radio interface (e.g., a GSM air interface) that may be used by mobile device 302 to communicate information (e.g., voice and data) to cellular network access infrastructure 306 (e.g., one or more GSM base transceiver stations, base station controllers and mobile switching centers). Persons skilled in the art will appreciate that cellular network access infrastructure 306 may utilize any multiple access architecture, such as for example, a code-division multiple access architecture and/or a time-division multiple access architecture.

Mobile device 302 may, for example, communicate with wireless access point 308 over a wireless interface (e.g., a Bluetooth interface or a Wi-Fi interface). Accordingly, for example, mobile device 302 may access one or more wired networks (e.g., IP network 312 and/or payment network 314) and/or one or more wireless networks 310 (e.g., a mobile network) without the need to first gain access to cellular network access infrastructure 306.

Payment information (e.g., a payment account number and a card expiration date) may be communicated from contactless device 304 to mobile device 302 in support of a transaction (e.g., a financial transaction) being conducted by mobile device 302. In so doing, for example, items for purchase on IP network 312 (e.g., the internet) may be accessed by a browser of mobile device 302 via an access point (e.g., wireless access point 308 and/or cellular network access infrastructure 306). Mobile device 302 may, for example, complete a purchase transaction by first obtaining required payment information from contactless device 304 and then communicating such payment information to network entities (e.g., merchant acquirer 317, payment server 316 and/or issuer 320). Mobile device 302 may, for example, already contain payment information necessary to complete a purchase transaction. Accordingly, mobile device may not need to obtain payment information from contactless device 304 before completing a purchase transaction.

Payment server 316 may, for example, contact issuer 320 via a network (e.g., payment network 314) with payment information received from mobile device 302 for authorization of a purchase. Once authorized, payment transaction information may be recorded onto a receipt that may be delivered to mobile device 302 via any one or more delivery options (e.g., via a short messaging service of mobile network 310 or an email delivery service of IP network 312).

A payment receipt may, for example, be provided to mobile device 302 as a proof-of-purchase object (e.g., a barcode) that may be provided to a display of mobile device 302 and read by other computing equipment (e.g., a barcode scanner) for proof-of-purchase confirmation.

Transaction card 333 (e.g., a powered card, non-powered card and/or device card) may, for example, communicate information to merchant terminal 318 (e.g., a magnetic stripe reader, an EMV reader, an RFID reader, an NFC reader and/or a swipe reader attached to an electronic device). Merchant terminal 318 may begin transactions (e.g., point-of-sale transactions) and/or complete transactions via merchant acquirer 317 and/or payment network 314. Accordingly, for example, transaction card 333 may communicate payment information to merchant terminal 318 to initiate a financial transaction.

Merchant terminal 318 may communicate transaction information, including at least a portion of the payment information, to merchant acquirer 317. Merchant acquirer 317 may authorize the financial transaction and/or communicate with payment server 316. Payment server 316 may, for example, contact issuer 320 via a network (e.g., payment network 314) with transaction information received from merchant acquirer 317 for authorization of a purchase. Once authorized, an authorization may be communicated to merchant terminal 318 and may be recorded onto a receipt by merchant terminal 318.

Application providers 338, 339 and 340 may be one or more entities (e.g., one or more servers) providing applications for association in an ecosystem provided by ecosystem provider 342. Each application may provide one or more features to users of a payment method (e.g., users of contactless device 304 and/or transaction card 333). For example, an application may provide a user an opportunity to earn a coupon and/or add value to a coupon in exchange for using the payment method. According to at least one example embodiment, application provider 338 may provide coupons as part of a loyalty or rewards program, which may be independent of any payment method. Ecosystem provider 342 may be, for example, a server that maintains associations between applications, users and payment methods.

Ecosystem provider 342, and application providers 338, 339 and 340, may communicate with different entities using one or more wired networks (e.g., IP network 312 and/or payment network 314) and/or one or more wireless networks 310 (e.g., a mobile network). Application providers 338, 339 and 340 may communicate directly and/or indirectly with different entities. For example, merchant terminal 318 and/or ecosystem provider 342 may communicate directly with application providers 338, 339 and 340 via IP network 312 and/or via a direct connection (e.g., to validate coupons with a coupon server). As another example, application providers 338, 339 and 340 may exchange information (e.g., transactional data) indirectly with issuer 320, merchant acquirer 317 and/or payment network 314 via, for example, ecosystem provider 342.

A user electronic device (e.g., mobile device 302 and/or a wired user electronic device 345) may display a GUI. The GUI may be an application manager used to interface with ecosystem provider 342, and application providers 338, 339 and 340, to define user preferences. Defining user preferences may include, for example, configuring associations (e.g., between users, applications and payment methods), features and/or permissions.

In order to configure associations, for example, the GUI displayed on the user electronic device may, for example, display indicia representing applications that provide features. A user may associate one or more of the applications to one or more payment cards and/or payment card buttons (e.g., mobile device 302 and/or transaction card 333)).

In order to configure one or more features provided by an application, for example, the GUI displayed on the user electronic device may be used to, for example, interface with one or more of application providers 338, 339 and 340. For example, using the GUI, a user may select a coupon from among multiple coupons provided by an application hosted by an application provider.

In order to configure associations, for example, a user may use the GUI displayed on the user electronic device to define how payment network 314, ecosystem provider 342, one or more of application providers 338, 339 and 340, and third-party applications hosted by the one or more application providers (or any other application providing entity) interact for transactions conducted by the user.

For example, a user may accept an end license user agreement that outlines how data may be shared between entities. As another example, a user may define what data may be shared between entities. For example, where data (e.g., transactional data) may be provided to ecosystem provider 342 by payment network 314, and/or provided to one or more of application providers 338, 339 and 340 by ecosystem provider 342, a user may select at least a portion of data provided to ecosystem provider 342 by payment network 314, and select at least a portion of data to be shared with the one or more of application providers 338, 339 and 340.

Prior to presenting transaction card 333 to merchant terminal 318 to initiate a transaction, a customer may select (e.g., via one or more button presses on a powered card and/or device card) an application to be associated to the transaction. Based on the selection, one or more additional actions may be taken besides the processing of the transaction by payment network 314. For example, a user may press a button on a powered card (e.g., transaction card 333). Upon presenting transaction card 333 to merchant terminal 318, a payment message (e.g., a magnetic stripe message) reflecting the button that was pressed may be communicated to merchant terminal 318. Merchant terminal 318 may communicate a data string including the payment message and transaction information to payment network 314 via merchant acquirer 317.

Payment network 314 may receive the data string. The data string may include a directive instructing payment network 314 to share data with ecosystem provider 342. According to at least one example embodiment, payment network 314 may share data with ecosystem provider 342 upon receiving the data string and recognizing, based on at least a portion of the data string (e.g., an account number), that data is to be shared. Payment network 314 may cause the same or a different data string to be communicated from payment network 314 (e.g., from a processor within payment network 314) to ecosystem provider 342.

Although example embodiments describe a payment network communicating data to an ecosystem provider, alternatively and/or additionally, an issuer and/or a processor of an issuer may receive data and communicate at least a portion of the data and/or different data based on the received data to ecosystem provider 342. For example, a processor of issuer 320 may parse a data string received from merchant terminal 318 (e.g., via payment network 314) that includes a particular BIN number, may convert the data string into a different format and may forward the converted data string to ecosystem provider 342. Persons of ordinary skill in possession of example embodiments will appreciate that many different messaging schemes may be used.

Ecosystem provider 342 may receive the data string and compare user information (e.g., payment account number and/or payment account holder's name) that may be included within the data string to a user database to obtain a customer ID (e.g., a customer token) associated with the user information.

According to at least one example embodiment, sensitive information within the data string (e.g., payment account number and/or payment account holder's name) may be replaced with the customer ID to create a modified data string, and the sensitive information may be stored either locally within ecosystem provider 342 or remotely to ecosystem provider 342. The modified data string may be communicated to a third party application (e.g., one or more of application providers 338, 339 and 340) via, for example, IP Network 312.

According to at least one example embodiment, ecosystem provider 342 may receive the data string. The data string may be populated with information that may be indicative of which button was pressed on the powered card before being presented to merchant terminal 318. Using the button information and user preferences, ecosystem provider 342 may generate a third-party message with details that may be shared with a third-party application (e.g., one or more of application providers 338, 339 and 340). The generated data string may include the customer ID and may be communicated to a third party application (e.g., one or more of application providers 338, 339 and 340) via, for example, IP Network 312.

A user may elect to share certain transaction information with one or more of application providers 338, 339 and 340 each time a certain button is pressed on the user's powered card before presentment to merchant terminal 318 for payment. Such information may include, for example, merchant information (e.g., merchant's address), date/time information of a purchase, an amount of the purchase, a type of the purchase, and any other information (e.g., the customer ID associated with the customer's merchant account). The various pieces of the transaction information may or may not be selected for sharing by the user via the user preferences.

According to at least one example embodiment, a user may agree to share data during a registration process with an application provider (e.g., via an end user license agreement). Upon receiving a data string, the sharable data may be automatically populated within a third-party message and communicated to an application provider via IP network 312.

Upon receipt of the third-party message, the application provider (e.g., one or more of application providers 338, 339 and 340) may enact a feature provided to a user (e.g., provide a coupon). The application provider may initiate a second transaction (e.g., a piggyback transaction, a statement credit and/or the like). The second transaction may be communicated to ecosystem provider 342 via IP network 312 (e.g., the internet) and processed by ecosystem provider 342 accordingly. For example, ecosystem provider 342 may determine whether a second transaction is permitted and/or forward information associated with the second transaction to another entity (e.g., issuer 320).

According to some example embodiments, a GUI may, for example, be rendered onto a display of a user's card or other device (e.g., mobile device 302, user electronic device 345, transaction card 333 and/or contactless device 304). The GUI may display indicia of one or more third-party applications (e.g., provided by one or more application providers 338, 339 and 340) along with summary and/or detailed information. Based upon information gleaned from the information concerning the applications, the user may be better informed as to which third-party applications he or she may wish to associate with his or her powered or non-powered card. Accordingly, the whimsical and festive nature of a user's experience with a GUI rendered by an electronic device may be further enhanced.

According to example embodiments, an application provider may be any entity. For example, ecosystem provider 342 may be an application provider in addition to providing an ecosystem. According to at least one example embodiment, an application provider may be a third-party application provider and ecosystem provider 342 may host the third party application (e.g., provide coupons). Data sharing may be the same or different based on a particular configuration.

Applet 391 may be provided on transaction card 333 or another device. Applet control information may be, for example, communicated to applet 391 during a payment transaction. For example, a cardholder may utilize the cardholder's portable telephonic device to change an account of a card (e.g., from a debit card to a credit card). This information may be communicated to a card during a transaction (e.g., utilizing EMV scripting). The card's applet then may, for example, fulfill the control request and change the account of the card for the transaction (e.g., from a particular debit card account to a particular credit card account). If, for example, the applet cannot change the account for the transaction, the applet can change the account for the subsequent transaction (e.g., which may involve terminating the transaction and not letting the transaction complete so the next successful transaction utilizes the new account or by not terminating the transaction and letting the transaction complete and the subsequent transaction would also complete).

Figure 4:
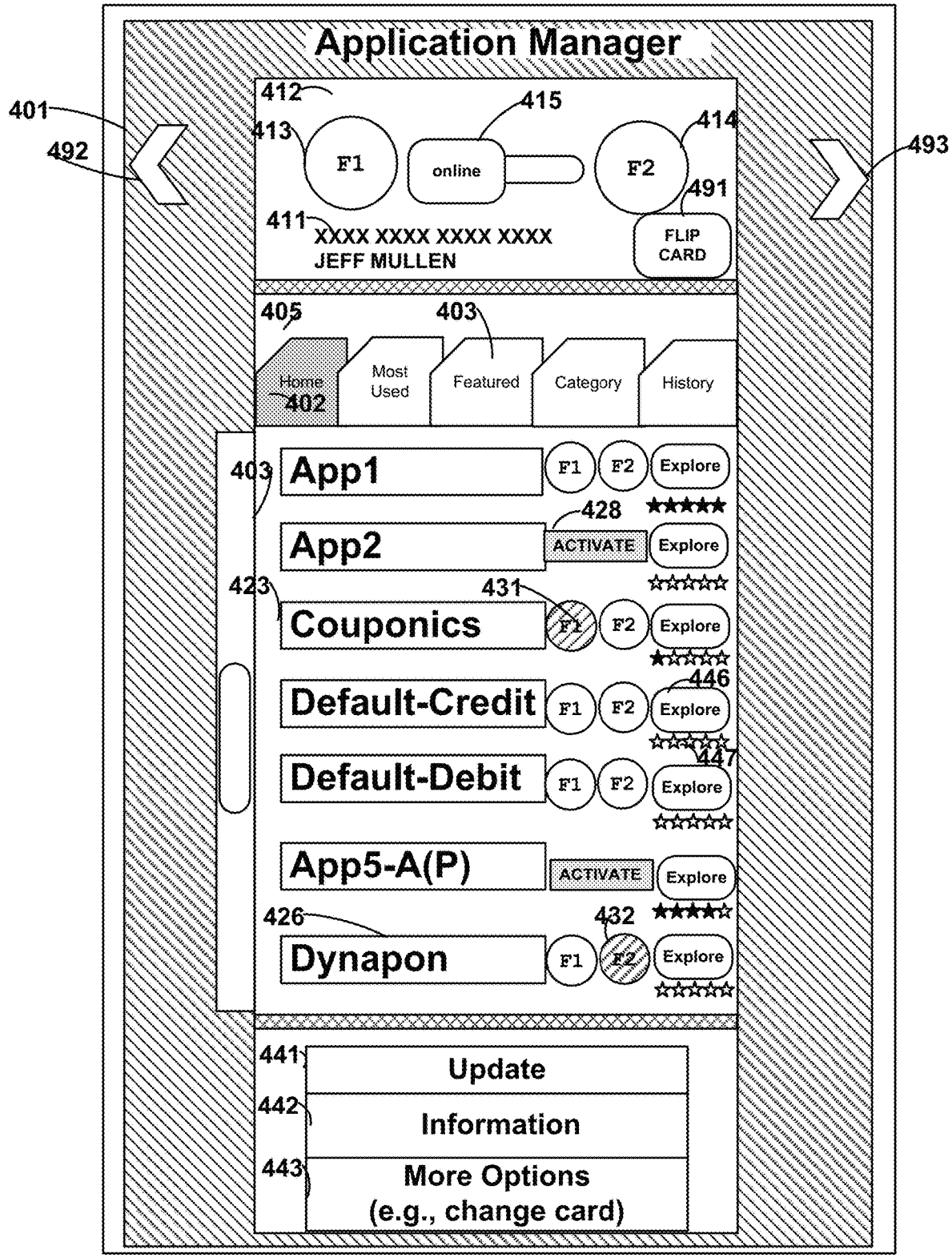
FIG. 4 is an illustration of a device constructed in accordance with the principles of the present invention.

FIG. 4 shows device 400 (e.g., a card, a mobile telephonic device, a laptop computer, a desktop computer or an electronic tablet) that may include display 401. Device 400 may include a processor that may render GUI 403 onto display 401. GUI 403 may be an application manager. Using GUI 403, a user may associate a payment method card (e.g., a powered physical card, non-powered physical card and/or device card) with third party service features within an ecosystem. GUI 403 may be displayed on display 401, for example, a computer monitor, mobile phone touch screen and/or the like. GUI 403 may be, for example, provided as an application for a device (e.g., a computer, a portable computing device and/or a mobile telephonic device) and/or retrieved information from a web browser.

An application manager may be provided, for example, on a remote facility and displayed via GUI 403 to allow a user to change the third party service features associated with a card. An application manager may manage an ecosystem of applications and payment method cards, and the user may utilize GUI 403 to, for example, associate a particular feature to a particular payment method card at any time. The user may associate the selected feature with a card and/or a card button.

Persons skilled in the art will appreciate that a default feature may be provided and/or that a number of features provided by a card issuer or other entity may be provided in addition to third party service features. For example, a card issuer may provide a card with a default of credit on one button and a default of decoupled debit on a second button. A user may press the first button to perform a credit transaction. A user may press the second button to perform a decoupled debit transaction.

GUI 403 may include tabs 405, information 411, virtual card 412, virtual indicia 413 and 414, slider 415, application identifiers 423 and 426, and selection options 428, 431, 432, 441-443 and 446.

Virtual card 412 may be provided as a representation of a user's physical and/or device card. A user may be provided with the ability to change between multiple different cards and configure the features associated with those multiple cards. Accordingly, virtual card 412 may be provided with indicia 413 in the configuration of, and indicative of, one button of a user's card, and virtual card 412 may be provided with indicia 414 in the configuration of, and indicative of, another button of a user's card. Indicia 413 and 414 may display the applications currently associated to each button (e.g., an application icon). A slider 415 may be provided to indicate which of applications associated with a button may be a default application (e.g., for online, telephonic and/or non-powered card transactions). Accordingly, a user may, for example, view virtual card 412 in order to refresh the user's memory with respect to the features associated with the buttons on a user's physical and/or device card.

A list of applications may be provided on GUI 403. Each application may provide one or more third party service provider features. In order to associate a particular feature with a particular card and/or one or more buttons on a card, a user may associate an application providing the feature to the card and/or card button(s). For example, selection 431 may associate application 423 to the button of a card associated with virtual button 413. Selection 432 may associate application 426 to the button of a card associated with virtual button 414. Accordingly, a user may change the features associated to a card by using GUI 403. In order to view the features provided by a particular application the user may, for example, select an "explore" button to view relevant information (e.g., selection 446).

The list of applications provided on GUI 403 may be, for example, all applications or a limited subset of all applications available to a user via an ecosystem provider. For example, in order to view all available applications, tab 402 may be selected by a user (e.g., with a keyboard, mouse, touch sensitive screen and/or electronic pointer) to display an application manager home view. In order to view a limited subset of applications a user may select a different tab. For example, tab 403 may be selected by a user to display a featured view including featured applications (e.g., applications-of-the-week). Other tabs may sort applications by category, use and/or the like.

Selections 428 may be selections used to activate an application with respect to the user. Activation may include registration with a third party application, acceptance of an end users license agreement associated with the application, and/or the like. Activation may also include selecting a particular feature from among multiple features provided by the application. According to at least one example embodiment, some applications may not require activation (e.g., single feature, non-interactive applications).

Once an application is activated and/or associated to a card and/or card button, a user may begin experiencing a selected feature by engaging in card transactions. For example, the user may press a card button associated with a desired feature during a card transaction. A physical and/or device card (not shown) may communicate information indicative of a button that was pressed on the physical and/or device card, along with or separate from other payment data (e.g., an account number, security code, and other data). For example, information indicative of the button that was pressed may be included in discretionary data of a payment message. A payment message may be, for example, one or more tracks of magnetic stripe data (e.g., communicated from a dynamic magnetic stripe communications device), an RFID message (e.g., a near field communication (NFC) message from a radio frequency antenna), and/or an exposed IC chip message (e.g., an EMV message) from an exposed IC chip.

The information indicative of which button was pressed may be passed to a card issuer and/or processor from a point-of-sale and any intermediary devices (e.g., a merchant acquirer processing server). The information may be passed to a remote facility (e.g., a facility providing an application manager) such that the remote facility may determine the button that was pressed by a user. This remote facility may, in turn, retrieve information associated with the third party feature (and/or a feature of a card issuer, processor, application manager provider, and/or any entity) and forward information to that feature provider such that the feature may be performed. Information may additionally and/or alternatively be provided from the feature provider to the entity that provided the information indicative of the button that the user pressed.

Persons skilled in the art will appreciate that if, for example, a non-powered card is utilized then information indicating that a button was pressed may not be available. With respect to a non-powered card, information indicative that a purchase was made may be provided to an application manager provider such that the application manager provider can initiate the desired feature for the non-powered card. For example, the feature may be a default feature, a selected feature (e.g., selected using an application manager) and/or a random feature.

For non-powered cards, for example, features may be associated with different types of purchases. For example, one feature may be provided for a particular merchant type (e.g., a grocer's coupon) and another feature may be provided for a different merchant type (e.g., a clothing store coupon). Features may be associated with other characteristics of a purchase such as, for example, a purchase above a particular amount (e.g., at or above $100) and/or a purchase below a particular amount (e.g., below $100). However, such additional feature selections are not limited to non-powered cards and may be provided to, for example, users of powered cards and devices.

According to example embodiments, any feature and/or capability not requiring a powered device (e.g., a computing device such as a powered card and/or mobile telephonic device) may be implemented with respect to a non-powered card and any feature and/or capability of a non-powered card may be implemented with respect to a powered card. According to at least one example embodiment, features and/or capabilities requiring a powered card may be implemented with respect to a non-powered card in various ways. For example, additional functionality may be provided at merchant terminals.

GUI 403 may be provided, for example, on a card issuer's and/or application manager provider's website. GUI 403 may be provided, for example, on a bill statement web page. Accordingly, a user may utilize the application manager to manage application features when the user is logged into his/her account. Although example embodiments described with respect to FIG. 4 may describe a GUI 403 used to make various selections and/or associations, persons skilled in the art will appreciate that other methods are possible. For example, selections may be made by phone, email and/or the like.

A third party service provider may utilize GUI 403 as part of a user's administration and/or experience of that third party service. For example, a user's profile page for a third party service may include GUI 403. An application manager provider may provide web-code that retrieves GUI 403 from a remote facility managed by the application manager provider and/or other entity (e.g., issuer, merchant acquirer, payment network, merchant and/or the like). Selection 441 may be utilized by a user to check for updates (e.g., confirm that a feature was changed and/or if any updates are present). Selection 442 may be utilized to explain the functionality of a particular application feature. Selection 443 may be utilized for additional selection options, for example, changing which card is displayed on an application manager.

According to at least one example embodiment, a card may be provided with one button for a particular payment account (e.g., credit) and one button for a changeable feature. Accordingly, a user may, for example, only need to remember one feature associated with a card. A credit account may include rewards, for example, points, cashback, and/or miles, from the card issuer. Accordingly, pushing the payment account button may earn the user such rewards. Pushing the changeable feature button may, alternatively, for example, not earn the user such rewards and may instead initiate a changeable feature. In doing so, for example, the cost of providing a card may be reduced in that the cost of rewards for the card may be reduced. A feature may include, for example, a feature from a third party application provider. The feature from the third party application provider may be, for example, a random reward (e.g., a random coupon).

Information 411 may, for example, identify the user and card number associated with virtual card 412 and a corresponding physical card. One or more of tabs 405 may provide, for example, a history of purchases made by a user. An application manager may provide indicia reflecting a user rating (e.g., star rating 447).

According to example embodiments, an ecosystem provider may be the same or different from an application manager provider, a remote facility and/or other entities. One or more of the functions described herein as being performed by an application manager provider, and/or other entities, may be performed by the ecosystem provider. According to at least one example embodiment, an ecosystem provider may act as an application manager provider, application provider, issuer, merchant, third party service provider, payment network and/or the like to provide an end-to-end experience. In general, example embodiments contemplate the same, greater and/or fewer entities, and specific entities are described for purposes of explanation.

One of ordinary skill in the art will appreciate that GUI 403 is provided for purposes of illustration only and may take various forms. For example, features may be associated to a card without buttons and/or a card may include the same, fewer and/or a greater number of buttons than depicted in FIG. 4.

Flip card option 491 may be utilized to flip a virtual card around to show a reverse of a card. Person skilled in the art will appreciate that a front of a virtual card and a back of a virtual card may correspond to a front of a physical card and a back of a physical card. For example, the back of a physical card may include a three or four digit security code and the back of a virtual card may also include a three or four digit security code (e.g., the same or a different security code). A personal identification code may be utilized to unlock a card so it can be utilized in a point-of-sale and/or permit one or more card numbers and/or security codes to be displayed. A personal unlocking code may unlock a card for a particular number of transactions (e.g., one, two, three, etc.) or for a period of time (e.g., an hour or an hour after a transaction).

Browsing arrows 492 and 493 may be utilized, for example, to change between different cards. A cardholder may, for example, load several card into a mobile payment wallet (e.g., on a mobile phone or a battery-powered card) and may scroll between different cards utilizing arrows 492 and 493. Arrow 492 may move to a card on the left of card 412 and arrow 493 may move to a card on the right of card 412. Person skilled in the art will appreciate that cards may be arranged in the order the cards were loaded, may be arranged in an order determined by a user (e.g., via an interface or via buttons/actions), and/or may be determined based on pre-determined settings. For example, the most used card may become the first card to be displayed or the last used card may become the first card displayed when a wallet is opened/displayed.

Figure 5:
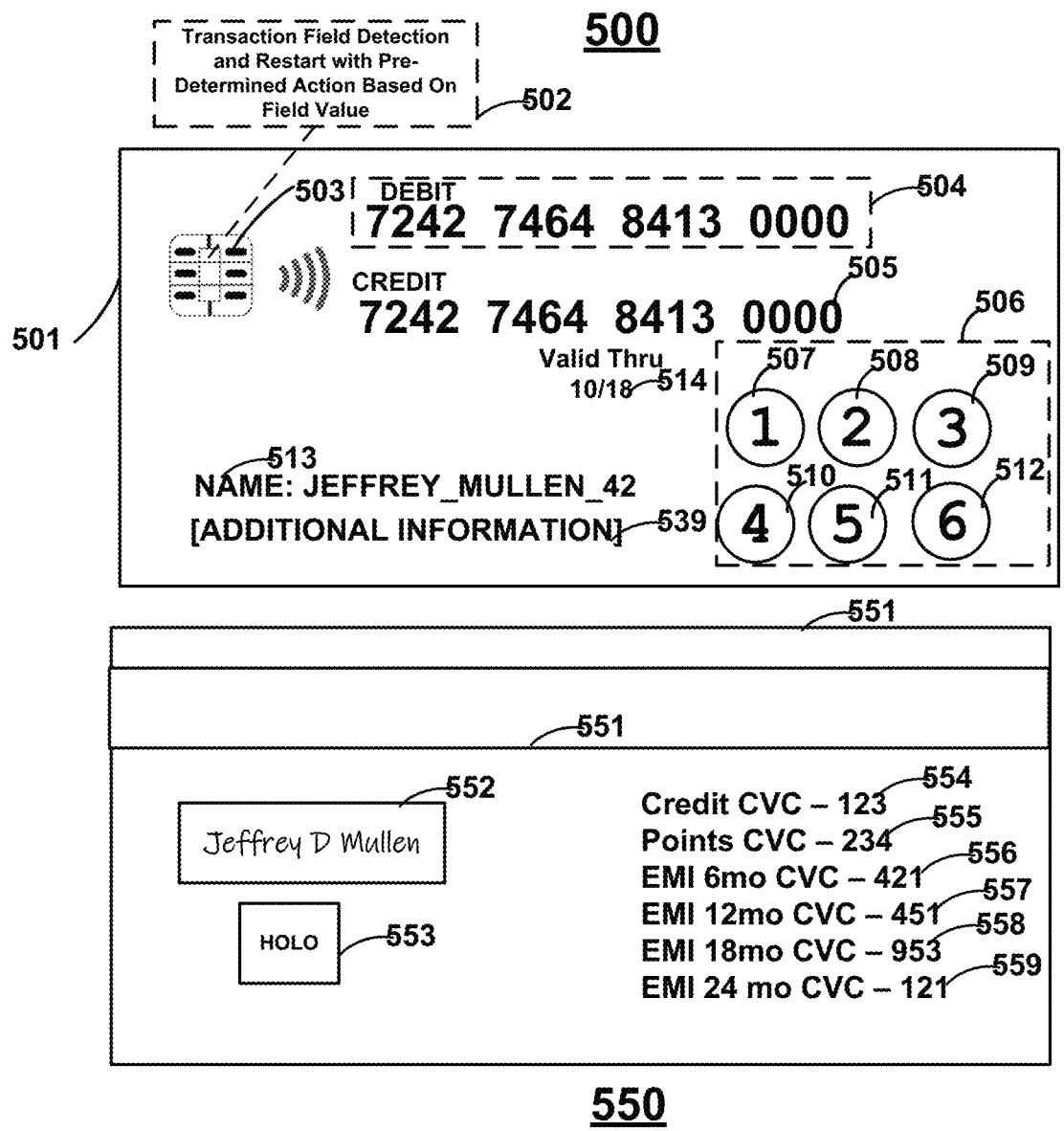
FIG. 5 is an illustration of a device constructed in accordance with the principles of the present invention.

FIG. 5 includes device 501 that may include contact chip 403, card account number 504, card account number 505, button array 506 that may include buttons 507-512, cardholder name 513, additional cardholder and/or card information 539, and any other communications device or structure (e.g., structures of card 100 of FIG. 1 and/or architecture 150 of FIG. 1). Applet 502 may be included in which a transaction field is detected, recognized as having an action associated with the detected transaction field (e.g., a particular value and/or range of values), and executing the action associated with the detected transaction field.

Persons skilled in the art will appreciate that one, two, tree, or more than three account numbers may be provided (e.g., printed and/or displayed) on one (e.g., obverse or reverse) side of a card or other device(s). Manual input interfaces may be associated to each card account so the card, or other device, communicates information associated with the selected manual interface. Manual interfaces may be, for example, mechanical interfaces (e.g., mechanical buttons), capacitive interfaces, or any other type of manual interfaces. Payment card account number, and associated information, may be downloaded to a card or other device and this downloaded payment card account number may be displayed on a display. Persons skilled in the art will appreciate that a payment card account number does not need to be displayed or printed on a card. Accordingly, a card may be utilized at a point-of-sale and the card may be secured from displayed the payment card number. Additionally, for example, a mobile telephonic device may provide a virtual card that displays a payment card account number, and associated data, for a payment card. That payment card account number may be associated with a payment account that is also associated with a payment card that does not have printed/displayed payment card account number. Persons skilled in the art will appreciate that multiple cards and/or devices may be associated with the same account and may have different payment card account numbers, and/or associated information. For example, a cardholder may have a card (virtual and/or physical) issued to a spouse and the devices/cards of the cardholder may be associated to the same account as the spouse so, for example, a single bill needs to be paid for both payment card account numbers. Similarly, for example, an employer may provide multiple workers with different payment card account numbers that are linked to the same account. Pan sequence numbers or other discretionary data may be utilized, for example, so that multiple cards/devices may have the same fifteen and/or sixteen digit account number but the differentiating information to distinguish the cards/devices is contained in the associated payment card data that is communicated at the point-of-sale (e.g., discretionary data). Accordingly, multiple devices may have the same printed/displayed card account number but different card data that is communicated through a transaction. Similarly, for example, tokens may be linked to overall cardholder accounts and these tokens may be utilized for individual cards/devices. Accordingly, new tokens may be issued to cards/devices (e.g., if a device is compromised) and be linked to the same account as the previous tokens so that a cardholder's experience is enhanced.

Card 500 may, for example, have a button associated with a credit payment functionality, a button associated with a pay with points/rewards functionality, and four buttons associated with an installment payment functionality (e.g. a 6-month, 12-month, 18-month, and 24-month installment functionality. Pressing different buttons may, for example, cause data to be changed in payment card data that is communicated to a point-of-sale reader (e.g., different discretionary data on the same payment account numbers, different payment account numbers, different pan sequence numbers, etc).

Device 550 may be the reverse side, for example, of device 500. Device 550 may include perimeter 651. Device 550 may include, for example, magnetic stripe 651, signature panel 652 for receiving pen marks (e.g., a signature), hologram 553, and printed or displayed indicia 654-659. Persons skilled in the art will appreciate that different payment options and/or cards may be utilized online by printing/displaying different security codes (e.g., CVV and/or CVC) on the card, For example, indicia 554 may be utilized as a card not present code for a credit transaction, indicia 655 may be utilized as an card not present code for a pay with points transaction, indicia 656 may be utilized as a card not present code for a first installment option (e.g., 6 month installments), indicia 657 may be utilized as a card not present code for a second installment option (e.g., 12 month installments), indicia 658 may be utilized as a card not present code for a third installment option (e.g., 18 month installment option). indicia 659 may be utilized as a card not present code for a fourth installment option (e.g., 24 month installment option). Person skilled in the art will appreciate that a single display may be provided and a button (e.g., a button used to select a payment card account number or a different button) may be utilized to cause a security code (e.g., CVC code) to change to a CVC associated with that button (e.g., associated with that payment option). A security code may be displayed on a display with a payment card account number and a button associated with a different payment card account number and security code may cause the selected payment card account number and security code to change. Any number of security codes may be associated to, for example, a payment card account number. Additionally, for example, a security code may change based on use and/or time, for example, in order to provide additional security.

A card may include, for example, different payment account numbers, for example, to deploy a pay with point and/or pay with installment functionality and/or another type of payment functionality. For example, a payment card number (e.g., a credit card number) and a card not present security code (e.g., a CVC or CVV) associated with a credit payment may be printed on a device (or displayed on a device) on the same side (e.g., the reverse or obverse side) or different sides (e.g., an obverse side a side other than the obverse side). On that same card/device, a different payment card number (e.g., a different credit card number) and a different card not present security code (e.g., a CVC or CVV) associated with a pay with rewards/points payment may be printed on a device (or displayed on a device) on the same side (e.g., the reverse or obverse side) or different sides (e.g., an obverse side a side other than the obverse side). On that same card/device, a different payment card number (e.g., a different credit card number) and a different card not present security code (e.g., a CVC or CVV) associated with a first installment option may be printed on a device (or displayed on a device) on the same side (e.g., the reverse or obverse side) or different sides (e.g., an obverse side a side other than the obverse side). On that same card/device, a different payment card number (e.g., a different credit card number) and a different card not present security code (e.g., a CVC or CVV) associated with a second installment option may be printed on a device (or displayed on a device) on the same side (e.g., the reverse or obverse side) or different sides (e.g., an obverse side a side other than the obverse side). On that same card/device, a different payment card number (e.g., a different credit card number) and a different card not present security code (e.g., a CVC or CVV) associated with a third installment option may be printed on a device (or displayed on a device) on the same side (e.g., the reverse or obverse side) or different sides (e.g., an obverse side a side other than the obverse side). On that same card/device, a different payment card number (e.g., a different credit card number) and a different card not present security code (e.g., a CVC or CVV) associated with a fourth installment option may be printed on a device (or displayed on a device) on the same side (e.g., the reverse or obverse side) or different sides (e.g., an obverse side a side other than the obverse side)

Persons skilled in the art will appreciate that payment options may be utilized with any type of payment product (e.g., credit and/or debit) and may be embedded such as, for example, by utilizing discretionary data (e.g., one character, two characters, three characters, or more than three characters) of discretionary data in payment card transaction data (e.g., magnetic stripe data, EMV contact data, and/or EMV contactless data). In doing so, for example, the transaction may authorize for that payment type (e.g., credit) and credit interchange may be earned by an issuer. Post-authorization, for example, the discretionary data may be reviewed and if payment option data is recognized a second transaction may be initialized in order to, for example, implement the payment option (e.g., pay with point and/or installment). For pay with points, a point bank associated with an account may be adjusted based on the amount of the transaction so long as, for example, enough points are in the bank to cover the transaction amount. An amount of money equal to the points may then, for example, be deposited in the account and may, using an account-to-account (e.g., monetary file transfer) transfer approach be listed as a transaction on a statement with a transaction description describing that points were redeemed for a particular transaction. Partial pay with points may be utilized, for example, if a point bank does not have the appropriate number of points. Multiple pay with reward/point options may be provided such, as for example. Pay full in points, pay half in points, pay a percentage (e.g., 10%), pay a fixed amount (e.g., $5 or $10) in points. A pay with fixed amount or percentage may be pushed multiple times, for example, so a cardholder can select how many points the cardholder wants to spend on a card. Accordingly, for example, if a denomination was $1 then a cardholder could press the button 5 times to redeem $5 in points. Displays and/or other light sources (e.g., LEDs) may be utilized to indicate the amount of times the manual interface as been pressed and/or the amount selected). Similarly, interfaces may be utilized to select monthly installment amounts (e.g., a 1-month button may be pressed six times for a 6 month installment). A transaction may be authorized (e.g., on credit to earn credit interchange) and a secondary transaction may be initiated (e.g., by a remote server) after data has been recognized that an installment was desired in the payment data (e.g., magnetic stripe, emv contact, and/or emv contactless data).

Persons skilled in the art will appreciate that in addition to pay with rewards and/or pay with installments additional payment options may be deployed. For example, payment options may be associated with the selection of different types of rewards (e.g., cashback, miles, donations to charity, etc.), the utilization of an offer (e.g., a coupon), earning a chance to win a reward (e.g., a game of chance as in a sweepstakes), earning a game of skill to earn a reward, etc. Person skilled in the art will appreciate that a transaction such as a credit transaction may include a percentage earned towards rewards. Pressing a button such as a game of chance or game of skill may, for example, forfeit the earning such underlying rewards for a chance to earn a larger reward.

Figure 6:
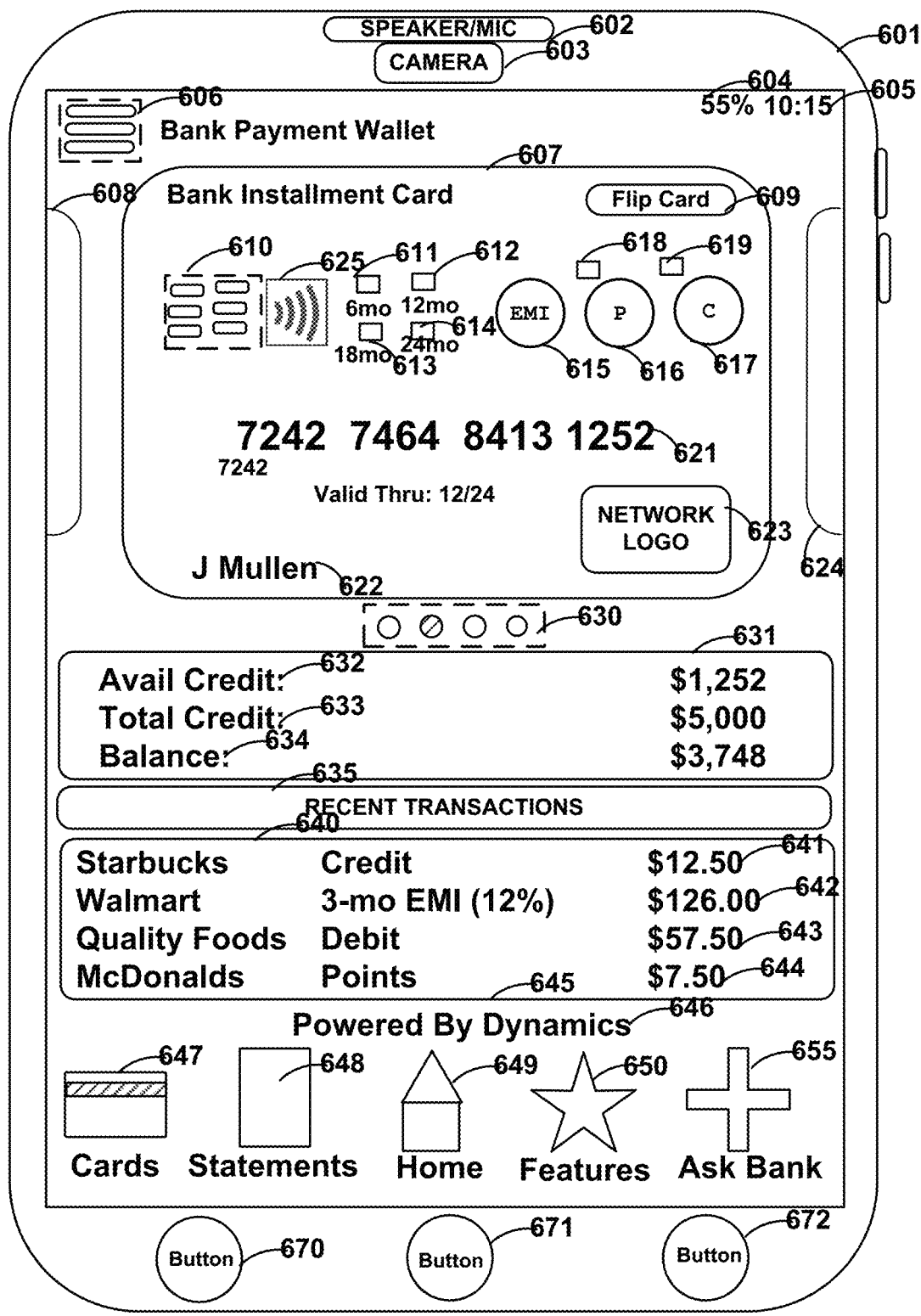
FIG. 6 is an illustration of a device constructed in accordance with the principles of the present invention.

FIG. 6 shows payment device 600 that may include, for example, one or more speakers and/or microphones 602, cameras 603, housings 601, displays having displayed indicia 604 (e.g., percentage of battery remaining), displayed indicia 605 (e.g., time), indicia 606 (e.g., expandable menu), flip card virtual button 609, contact india 610, contactless indicia 625, light source indicia 611, light source indicia 612, light source indicia 613, light source indicia 614, interactive button 615, interactive button 616, interactive button 618, lightsource indicia 618, lightsource indicia 619, payment card number 621, information 622, network logo 623, card indicator 630, virtual card 607, virtual card 606, virtual card, 610, information area 631, indicia 632, indicia 533, indicia 634, information area 640, indicia 641, indicia 642, indicia 643, indicia 644, indicia 646, virtual button 647, virtual button 648, virtual button 649, virtual button 650, virtual button 655, manual interface 670, manual interface 671, and manual interface 672. Persons skilled in the art will appreciate that device 600 may be any device such as a payment card or a mobile telephonic device.

Device 600 may include, for example, an executable native application and/or a web-based platform that provides the cardholder with a mobile wallet where multiple cards may be stored, browsed, selected, and utilized for both card present (e.g., point-of-sale terminals at a physical merchant location) and card-not-present (e.g., phone, mail, online) transactions. Cards may be loaded through various processes such as a host card emulation process (e.g., for issued virtual/physical cards) or a card personalization process (e.g., for cards not yet issued as virtual/physical cards). For example, a card that has been issued can be utilized in a host card emulation process to recognize the card and identify and authenticate the cardholder so that a virtual and/or physical card may be issued (e.g., on a new device such as a new card device or mobile telephonic device). A physical card (e.g., a battery powered card or a non-battery powered card) may be virtualized into a mobile device and may provide a similar experience or the experience may be enhanced. For example, a card with a credit button, an installment button with 4 installment toggles, and a pay with points button may be virtualized to have virtual buttons and provide the same functionality at, for example, a point-of-sale terminal (e.g., a contact, magnetic stripe, and/or contactless communication). For example, a consumer may select virtual button 617 to communicate information for a credit transaction, button 616 to communicate information for a pay with points transaction (e.g., on the credit rails), button 615 to communicate information for a pay with installment transaction (e.g., on the credit rails). Pressing button 615 may toggle through light source indicators 611-614 so the cardholder can select an installment option (e.g., 12-month equated monthly installment associated with light source indicator 612). Accordingly, light source indicators may transition from one state to another state based on a button associated with the light show indicator being utilized.

Persons skilled in the art will appreciate that information from a mobile device such as a mobile telephonic device may be communicated (e.g., wirelessly through a cellular modem) to a remote server. During a payment transaction, the information in this remote server may be communicated to a card or other device during a payment transaction such that information selected on a phone is delivered to a card. A payment applet in the card may utilize this data to provide different features. For example, a cardholder on a mobile telephonic device may change a virtual card from a credit card to a debit card and a static non-battery powered card may receive this data and change the data communicated in the transaction where the data is received or a subsequent transaction to change the card number (e.g., from debit to credit). Similarly, for example, a cardholder may select a particular option (e.g., installment option) and this may be communicated to a battery-powered card through data communicated through a payment transaction and the card may be switched to utilize that payment option. Data from a virtual card may be communicated to a physical card and may cause, for example, any action on a physical card such as light sources (e.g., LEDs) to activate on a physical card, images and/or messages to be displayed, cards to be loaded, etc. Persons skilled in the art will appreciate that a card and/or mobile device may communicate through a remote server to each other, directly to each other, through a remote server to each other during a payment transaction. Accordingly, information may be downloaded from one device to another device during a payment transaction (and vice versa) or, for example, information may be communicated outside of a payment transaction (e.g., directly or through a remote server or other system). More than two cards and/or devices may communicate with each other. For example, one card (e.g., a card of a business executive) may communicate to more than one other card (e.g., the card of multiple employees under the business executive). As per another example, a parent in a family may communicate information to cards and/or devices to a subset of the family (e.g., children) or all of the family (e.g., spouse and children). Communication rules and actions may be setup on a card, device, or other system (e.g., a website) and communicated to any device or system (e.g., the cards and/or other payment devices). Similarly, a website may provide controls. A cardholder may log into a website, authenticate themselves with a password, receive a mobile wallet, and may make selections on that mobile wallet that are then communicated to autonomous and adaptive program logic in a payment applet on one, more than one, or all devices with an association to the payment account(s) on the mobile wallet.

Persons skilled in the art will appreciate that a mobile payment wallet may be configured to a particular bank/entity, group of banks/entities, a particular payment networks, multiple payment networks, etc. Accordingly, for example, a mobile payment wallet may be provided as an executable application that may be downloaded from a mobile application service (e.g., an application store) and utilized for payment products for that particular issuer (or group of entities). Information may be stored on a remote server so that if a device (e.g., card or mobile telephonic device) is lost a new device may receive a login and/or password from a cardholder (or be identified in another way) and the previously stored information (cards, settings, information) may be restored. Similarly, if a device such as a card and/or mobile device is lost, a cardholder may go to a website (e.g., on any device) identify and authenticate themselves, retrieve the wallet, and deactivate cards so that the cards cannot be utilized on the lost cards. New cards may then be issued on non-lost devices so that when the other devices are loaded and/or logged into the new cards automatically update.

Card indicator 630 may be utilized, for example, to indicate to the user the location of the card (e.g., card 607) the cardholder is viewing as the primary card compared to the other cards. Card 607 may be in a mobile wallet with multiple cards such as card 608 and 624. Any number of payment card numbers may be associated with any single card on the mobile wallet, which may be provided on a display of a card, website, display of a mobile device, or any other device.

Information 631 may include information associated with a card associated with information 631 (e.g., a card currently selected by a cardholder). Information 631 may include information on the various payment card numbers, options, or any data associated with the card. For example, information 631 may include an available credit line (e.g., indicia 632), total credit line (e.g., indicia 633), and balance due (e.g., indicia 634). Information 635 may include, for example, title and associated information for attributes associated with a particular card (e.g., a select card of a mobile wallet). Person skilled in the art will appreciate that a physical card with multiple card numbers is a device that stores and utilizes multiple accounts (e.g., autonomously, as a result of manual input, etc.). Information 640 may be associated with, for example, a card of a mobile wallet such as, for example, a card being viewed in the mobile wallet. Such information may include a list of transactions the card has made, any associated options that were utilized, the amount, and any other information associated with the transaction (e.g., date and/or time). Indicia 641 may be associated with a merchant transaction on credit. Indicia 642 may be associated with a merchant transaction for an equated monthly installments (EMI). Terms associated with the payment option may be displayed such as, for example, the number of installments and a cost, if applicable, such as a fee and/or interest rate (e.g., a percentage rate and/or the resultant amount). Interactive buttons 647-655 may be utilized to initiate additional features such as card features, statement features, home features, other features, and ask bank features. A card feature may, for example, provide a cardholder with an overview of cards and permit the addition, modification, and/or deletion of cards. A statement feature may include an overview of all statements, communication notifications for statements and other information such as transaction notifications (e.g., via text messaging and/or application notifications), home 649 may remove a cardholder from other features and bring the cardholder to a wallet usage and navigation screen (e.g., the graphical user interface of FIG. 6). Features 650 may be utilized to access additional features such as personal finance management tools, spending limits, etc. Ask a bank feature may be utilized, for example, to see a frequently asked questions, interact on a chat and/or phone with a representative, send a message (e.g., email message, and/or retrieve phone numbers for various departments, topics, and/or representatives. A device may include multiple manual user interfaces such as interfaces 670-672 to operate the device, initiate applications such as one or more wallet applications, switch between open applications such as one or more wallet applications, and terminate applications such as one or more wallet applications.

Persons skilled in the art will appreciate that a card may be loaded in an active, ready for payment state so that a phone just has to be tapped against a terminal and contactless information may be communicated. A device may have a chip and/or expandable contact chip so that a mobile phone may have a portion that can be expanded out of the phone, or can be removed from the phone, for contact transactions. Magnetic stripe transactions may be performed wirelessly by wirelessly communicating magnetic stripe data to the magnetic stripe read-head of a magnetic stripe reader. A card may also show a QR code that may change with each payment card number and payment option and may also, for example, change with each transaction on that card number and payment option (e.g., for security via a dynamic QR code). Alternatively, for example, payment information may be ready to communicate as well as communicate after a button has been pushed (e.g., a credit button, points button, installment button, etc). A personal identification code may be utilized so that a request for a personal identification code is prompted at particular times (e.g., when a card is to be utilized for a card present and/or card not present transaction, a card is loaded into a wallet, modified, deleted, etc.).

Figure 7:
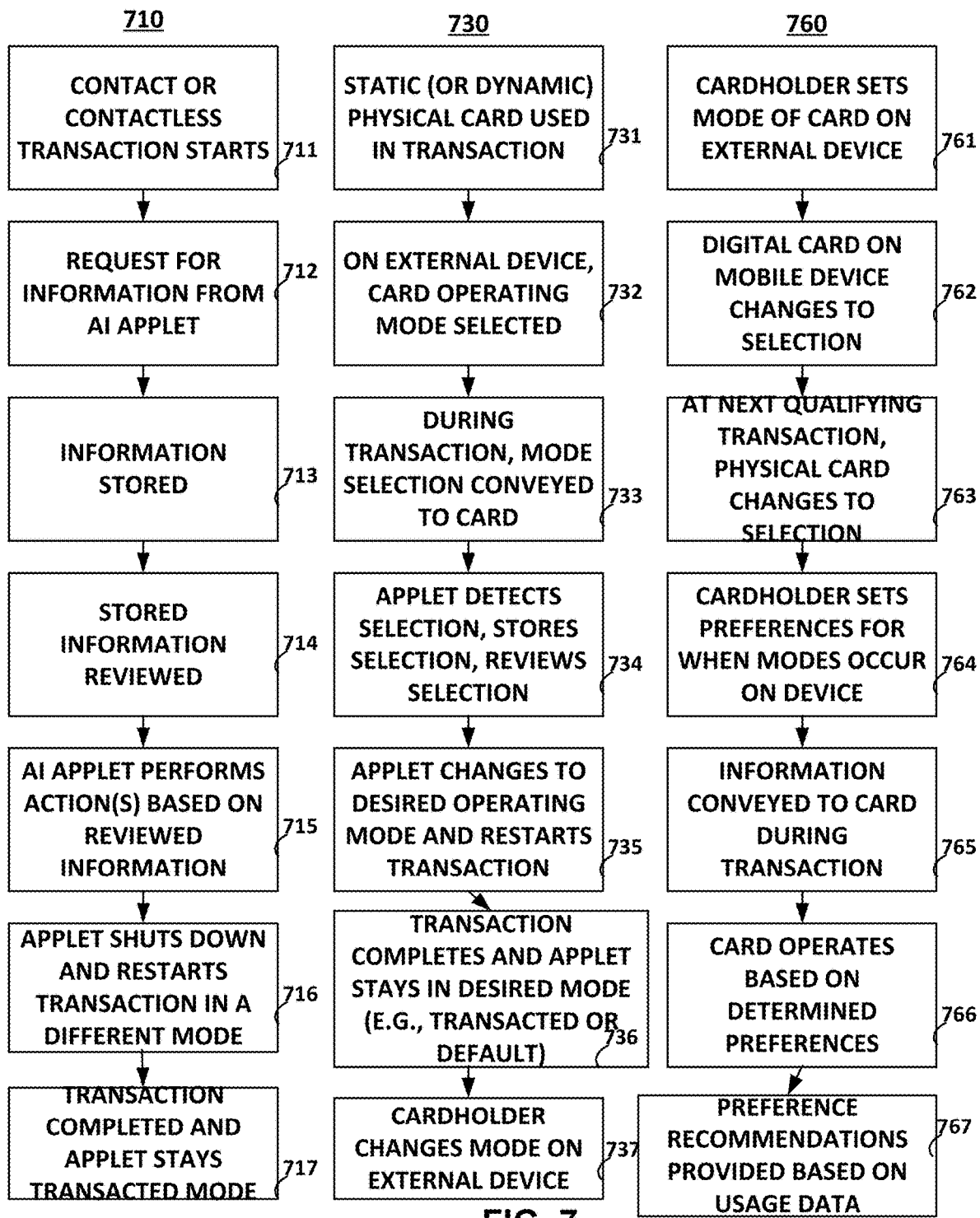
FIG. 7 is an illustration of flow charts constructed in accordance with the principles of the present invention.

FIG. 7 shows flow charts 710, 730, and 760. Flow chart 710 may include step 711 in which a contact, contactless, or another type of transaction may be initiated. Request for information from a payment applet may occur in step 712 and may include, requesting information from a point-of-sale terminal or other system (e.g., a remote server) for information about the transaction or if there is any information for a payment applet (e.g., control information). Persons skilled in the art will appreciate that a request for information may occur and a request for information step may not occur (just like any steps or processes). For example, information may be pushed to the payment applet (and/or vice versa). Received information may be stored in step 713, stored information may be reviewed in step 714. A determination may be based on the review and an applet may perform an action based on the reviewed information in step 715. An applet may shut down and the applet may wait for a new transaction to start or may start a new transaction and may do so in a different mode (e.g., with a different payment card number and/or different payment option). The transaction may complete in step 717 and the applet may stay in the same mode awaiting the next transaction. Person skilled in the art will appreciate that a payment applet may receive and sent information in any transaction (e.g., the transaction after a payment applet shut down).

Process 730 may be included and may include step 731 in which a static and/or dynamic card may be utilized in a transaction. Step 732 may be included and an operating mode for the card may be selected on an external device such as a mobile telephonic device. Accordingly, for example, a static card with no buttons may receive, in for example a payment applet, instructions during a transaction to change the card number, payment option, or other information or features and utilize the received information in executing a current or future payment transaction. A mobile telephonic device may, for example, communicate this information (e.g., to an issuing bank, to a payment network, to a third-party remote server, to the manufacturer of the card, to a manufacturer of the mobile telephonic phone, etc.) and this information may be pushed to the card or pulled from the car during a payment transaction or outside a payment transaction.

Step 733 may be included in which mode selection, or other information, may be sent to a card other device or other system during a transaction. Step 734 may be included in which an applet detects the received selection, stores the selection, reviews the selection, and includes any other steps. The payment applet may change to the desired and/or requested operating mode in step 735 and may restart the transaction. The transaction completes and the applet may stay in the desired mode in step 736 (e.g., for the next transaction, a certain number of transactions, and/or defaults to the mode for all transactions until, for example, changed). Cardholder may change the mode on an external device in step 737 and the new changed mode may be conveyed to any number of cards, devices, or other systems (e.g., a web-based system where all mode changes may be reviewed by cardholder and/or an administrator) during a transaction, outside of a transaction, directly to the device/card/system, or through one or more intermediary systems (e.g., remote servers).

Process 760 may be included and may include step 761 in which a cardholder may set a mode of a card (or other device) on an external device (e.g., a mobile telephonic device such as a mobile phone or a mobile watch). A digital card on the mobile device may be changed to the selection in step 762 and, at the next qualifying transaction, an associated physical card may also change to the selection in step 763.

Cardholder may set preferences when modes occur on a device in step 754. For example, a cardholder may set a preference of when modes change (e.g., current transaction or next transaction), attributes of modes (e.g., number of months in installments, amount of rewards being utilized, etc.) Information (e.g., mode information and/or preference information) may be conveyed to a card during a transaction in step 765. Card (or other device) may operate based on determined preferences in step 766 and preference recommendations may be provided to a cardholder (or administrator) based on usage data (e.g., transaction and/or device usage data) ins step 767. For example, a cardholder may be recommended improved strategies for installments and/or rewards usage to, for example, maximize rewards and/or minimize fees while achieving certain objectives (e.g., defer $X in a particular month or months).

Figure 8:
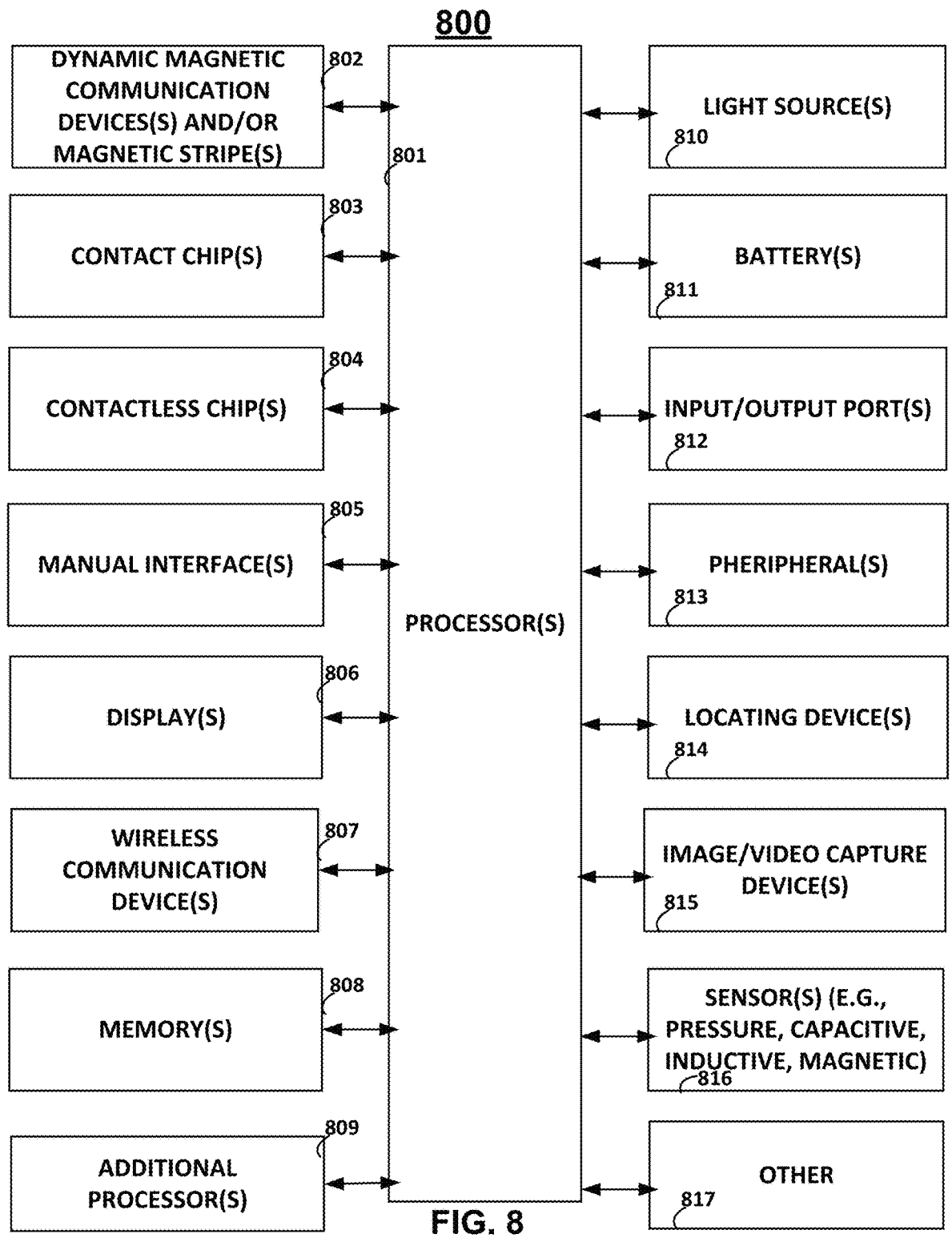
FIG. 8 is an illustration of a device constructed in accordance with the principles of the present invention.

FIG. 8 shows device 800. Device 800 may be, for example, a payment card or other payment device (e.g., mobile telephonic device).

FIG. 8 may include one or more dynamic magnetic communication devices and/or magnetic stripes 802, contact chips 803, contactless chips 804, manual interfaces 805, displays 806, wireless communication devices 807, memories 808, additional processors 809, light sources 810, batteries 811, input/output ports 812, peripherals 813, locating devices 814, image/video capture devices 815, sensors 816 (e.g., pressure, capacitive, inductive, magnetic), and/or other components 817.

A card may have a display such as a pixelated display operable of displaying a cardholders payment network logo, cardholder name, payment account number, payment expiration date, payment security code for online transactions (e.g., CVV2, CVC2), card name, and other pieces of information.

Messages associated with a particular time and/or date may be pre-stored. For example, messages associated with an anniversary date of the issuance of the card, consumer birthday information, country holidays, religious events, or any notification or message associated with a particular time or date. For example, a message wishing the consumer a happy birthday and providing the consumer with a QR code coupon for a certain amount in value may be displayed based on a date received during a payment transaction (and, for example, a clock in the payment device that updates the stored date as time passes). Persons skilled in the art will appreciate that a birthday event may trigger a feature such as a game feature where a consumer gets to pick a gift box from a number of gift boxes where each or one ore of the gift boxes has a different amount or type of value stored in it. Accordingly, a marketing campaign may be provided where on your birthday you have the chance to win a statement credit for your payment card bill in different amounts based on, for example, an instant no-purchase necessary sweepstakes where on the cardholders birthday the cardholder is provided instant statement credit value based on different odds of receiving different amounts of value. Pre-stored messages based on time could be provided so that a different message is released at a particular time (e.g., 9 am EST) every day. Date-based messages could include for example, new years, Christmas, Ramadan, each day of hannakah, memorial day, independence day, election day, etc.

Messages may be displayed on the payment device for example based on the first authorized transaction after a certain date/time. For example, a message may be pre-stored and displayed on the first authorized transaction after the first year of being issued the payment device or payment account on the payment device.

Payment devices, such as payment cards, may include, for example, one or more displays, light emitting diodes, programmable magnetic stripes that can change the magnetic stripe data on the magnetic stripe, programmable EMV chips, programamble contactless chips, cellular chips and antennas for downloading data from a remote source, manual interfaces, sound interfaces, etc. . . . .

Security features may be provided based on the received data. For example, a dynamic security code may be changed based on time and/or date information received from the payment device during an authorization transaction on a two-way authorization process (e.g., via an EMV or contactless transaction). The dynamic security code may provide a dynamic in-stripe security code (e.g., CVC1/CV1) and on-line security code (e.g., CVC2/CVV2). They may be the same or different security codes based on time and/or date or other information received and multiple types of information received (e.g., a different code may be provided based on time and country information received during a payment transaction).

Pre-stored messages may be provided based on any information received such as, for example, country code. A welcome message may be provided after a consumer makes a payment transaction in a new country that welcomes the user to the country and provides the consumer with payment information (e.g., exchange rates) based on that country. After each authorized transaction, for example, a card may display information on the transaction (e.g., amount of the transaction) in both the local and foreign currency by using information received and/or logic on the card.

Transaction applets may be provided that changes the account or payment option information based on what was received during the transaction. For example, if a US card account is utilized in Spain then the card may change the account to a Spanish account for future transactions (unless otherwise directed by the cardholder). In doing so, the payment device can receive information and change the way the payment devices operated based on the received information.

Any information could enable a new account (e.g., debit credit) or payment option (e.g., EMI, pay with points) for the current or a future transaction. A card can terminate a transaction based on information received and start a subsequent transaction (e.g., by having the cardholder remove and replace the card in a chip contact reader or reinstitute a new contactless transaction, etc. Persons skilled in the art will appreciate that payment terminals can be constructed to reinstitute transactions automatically if a transaction fails.

Example types of information receivable to cause modification of an applet, or by an applet, may include, for example, amount authorized (numeric), amount other (numeric), terminal country code, terminal verification results, transaction currency code, transaction data, data authentication code, ICC dynamic number, CVM results, transaction time, merchant custom code, transaction currency code, transaction date, transaction type, TVR, unpredictable number, or any other type of information from any source (e.g., a remote server of the issuer, processor, network, card manufacturer, device manufacturer, service provider, etc.)

Information may be pre-stored such as during personalization or during personalization updates.

Personalization data may be, for example, encrypted. According to some example embodiments, encrypted personalization data may be sent over a transmission link (e.g., cell network, Bluetooth, NFC, etc.). A perso data block may have a unique session identifier preprogrammed into a secure element (SE) which may be used as part of an decryption process.

Data may be encrypted at multiple levels. For example, a two level embodiment may include transmission link encryption. An entire block of perso data may be encrypted (e.g., 3DES, AES, etc.) during transmission. This block may be decrypted by, for example, a general purpose processor (GP). The GP may use a unique Session Identifier to request the transmission decryption key from the Secure Element.

Such a two level embodiment may further include encryption of sensitive perso data (personal data of a cardholder)—sensitive perso data such as UDKs may be encrypted such that they will never be in the clear. This information may be sent encrypted to the SE (such as a secure element chip) and may be decrypted inside the Secure Element. This decryption process may be performed by an applet installed on the SE.

Cards may be preloaded with sets of keys in the SE that are associated with: Transmission Link Key—This key may be utilized by the GP to decrypt the entire perso data block that was received. The GP may provide the unique session identifier provided with the perso data Block to the SE such that the appropriate key can be provided. Multiple unique transmission keys (each associated with a unique Session Identifier) may be preloaded such that multiple perso upgrades can be performed over the life of the card. This process may be protected from attacks by, for example, only allowing three attempts to request the transmission link key and if the proper unique session identifier is not provided within three attempts, the process may be blocked going forward. Sensitive Perso Data Key—This key may be utilized by the SE to decrypt sensitive perso data. The unique session identifier may be provided to the SE to be able identify the proper preloaded keys to decrypt the sensitive perso data. Multiple unique sensitive perso data keys (each associated with a unique Session Identifier) may be preloaded such that multiple perso upgrades may be performed over the life of a card. This process may be protected from attacks by only allowing three attempts to provide a unique session identifier and if the proper unique session identifier is not provided within three attempts, the process will be blocked going forward.

Personalization data may be pre-loaded. According to some example embodiments, preloading either multiple entire sets of perso data or multiple partial sets of perso data (which may be unique to this card) which may be triggered to be used by sending a signal to the card over a transmission link (e.g., cell network, Bluetooth, NFC, etc.) to change account information.

Complete sets of personal data and multiple sets of personalization data may, for example, be utilized which may include changes based on an update to PAN sequence number only or entirely different PANs can be preloaded on the SE. Each of the accounts may be associated with a Unique Account Identifier programmed into the SE. When a change in account is deemed necessary a signal may be sent to the card including the Unique Account Identifier associated with the next set of account data. This unique account identifier may be sent to the SE and if it matches the next account data the card may begin using that account information. This process may be protected from attacks by only allowing three attempts to provide a unique account identifier and if the proper unique account identifier is not provided within three attempts, the process may be blocked going forward.

Partial sets of personal data may, for example, be utilized in order to minimize the amount of data preloaded, only the unique data associated with an account upgrade (PAN, UDKs, certificates, etc.) may be preloaded. Multiple partial sets of Perso Data which may, for example, include changes based on an update to PAN sequence number only or entirely different PANs may be preloaded on the SE. Each of the Partial Sets of Perso Data may be associated with a unique account identifier programmed into the SE. When a change in account is deemed necessary a signal may be sent to the card including the unique account identifier associated with the next set of account data. This unique account identifier may be sent to the SE and if it matches the next account data the card may begin using that Account information. This process may be protected from attacks by only allowing three attempts to provide a unique account identifier and if the proper unique account identifier is not provided within three attempts then a protective action may occur (e.g., card may be disabled until cardholder properly identified, etc.).

Figure 9:
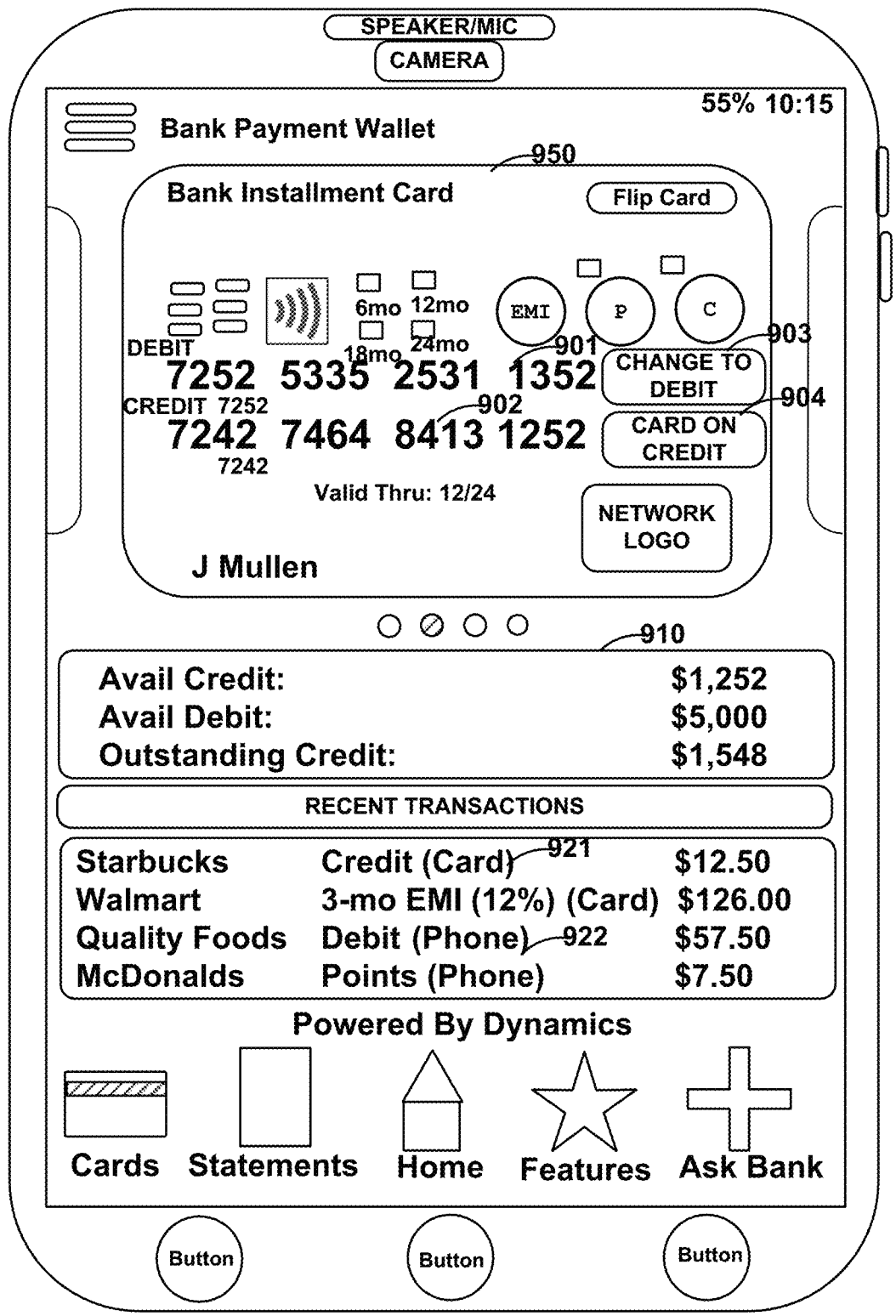
FIG. 9 is an illustration of a device constructed in accordance with the principles of the present invention.

FIG. 9 shows device 900 that may include a mobile payment wallet that can be pre-stored or can be modified to add any number of payment cards such as card 950. Card 950 any include payment card account number 901, payment card account number 902, change virtual button 903, and change virtual button 904. Persons skilled in the art will appreciate that an account may be selected for use in a point-of-sale terminal by selecting a button that corresponds to an account. An account may be defaulted and may not need any button selection. Selection of a button (e.g., change to debit button 903) may change to debit account number 901 being utilized for transactions and button 904 may correspond to account number 902 being utilized. Persons skilled in the art will appreciate that the information on account selection may be communicated to a remote server and communicated down to a physical card that corresponds to virtual card 950 and a payment applet on this physical card may change at (e.g., starting at) the current and/or next transaction the selected account. Physical card associated with virtual card 950 may have similar features to card 950 such as, for example, two account numbers printed on the card (e.g., for card not present transactions) and associated information (e.g., security codes, expiration dates, etc.). Information 910 may correspond to information associated with card 950 and may include, or example, the available funds in the payment account numbers associated with card 950 e.g., debit, credit, pre-paid, and/or any other type of payment product such as a secured credit payment product). Information 910 may include, for example, available credit, available debit, outstanding credit, etc. Information associated with transactions may be shown and may include transactions made on the accounts regardless of device. The type of device utilized may be shown on any device such as indicia 921 (e.g., a card transaction such as a physical card associated with virtual card 950) and indicia 922 (e.g., a phone transaction as a transaction with virtual card 950).

Figure 10:
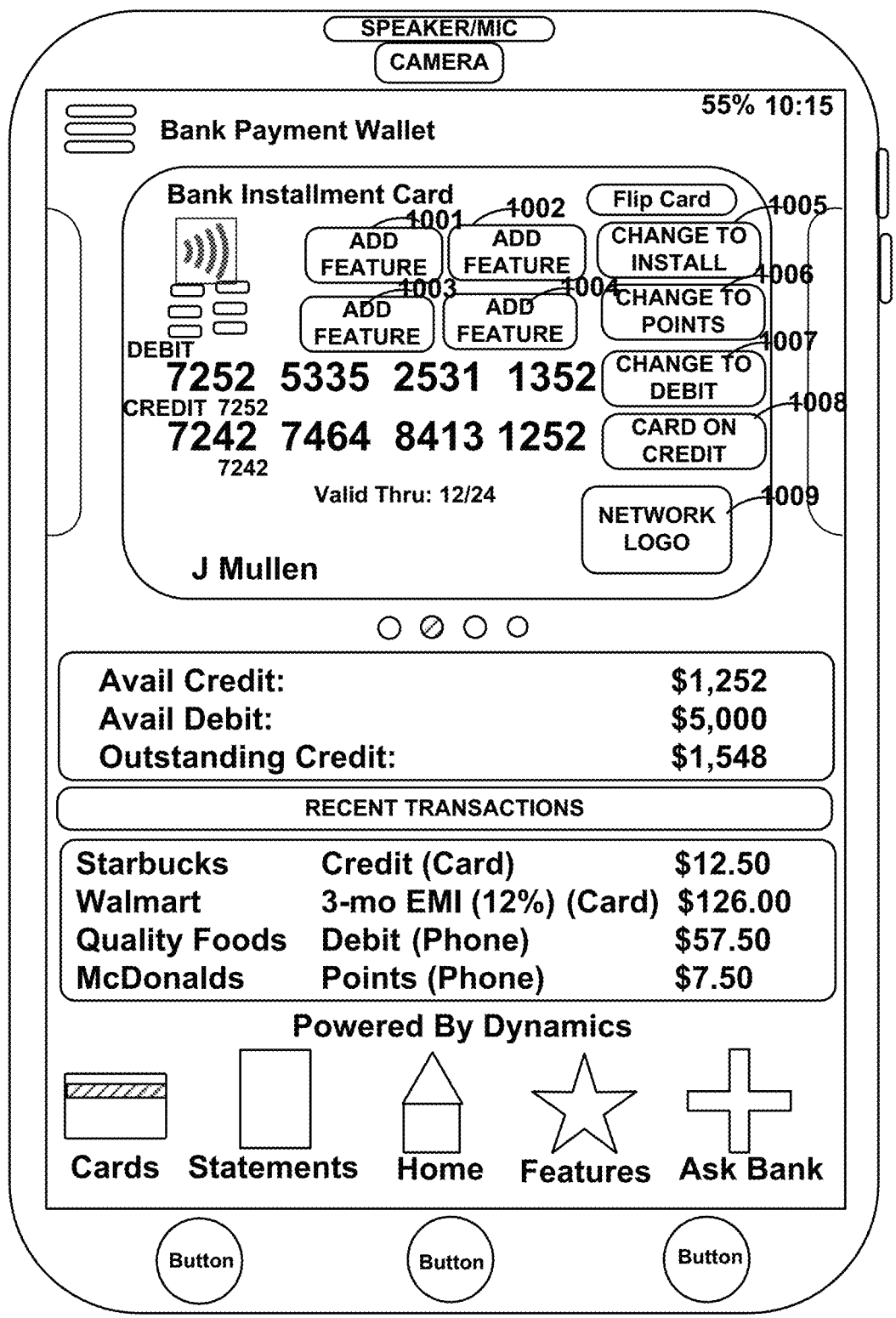
FIG. 10 is an illustration of a device constructed in accordance with the principles of the present invention.

FIG. 10 may include device 1000 which may include virtual buttons 1001-1004, virtual buttons 1005-1006, and network logo 1009. Persons skilled in the art will appreciate that a card may have multiple logos such as multiple network logos such as multiple network logos for different network products (e.g., mastercard debit, mastercard world, mastercard world elite, etc). The logo may change, for example, based on the selected card. Features may be added utilizing one or more buttons e.g., buttons 1001 to 1004 such as different installment features. As a result, a consumer can add different installment options (e.g., 3-month, 6-month, 9-month, 12-month, 15-month, 18-month, 21-month, 24-month, 36-month, 48-month) installments and then select an option for a transaction. Buttons 1005-1008 may be utilized to also select cards and/or options. Persons skilled in the art will appreciate that after a feature is added, the feature may be shown and then may be selected and/or de-selected and/or changed. Features may be removed and new features may be added. New features may thus be issued after a physical card and virtual card has been issued and may be added by a cardholder and this may then be communicated to a physical card.

Figure 11:
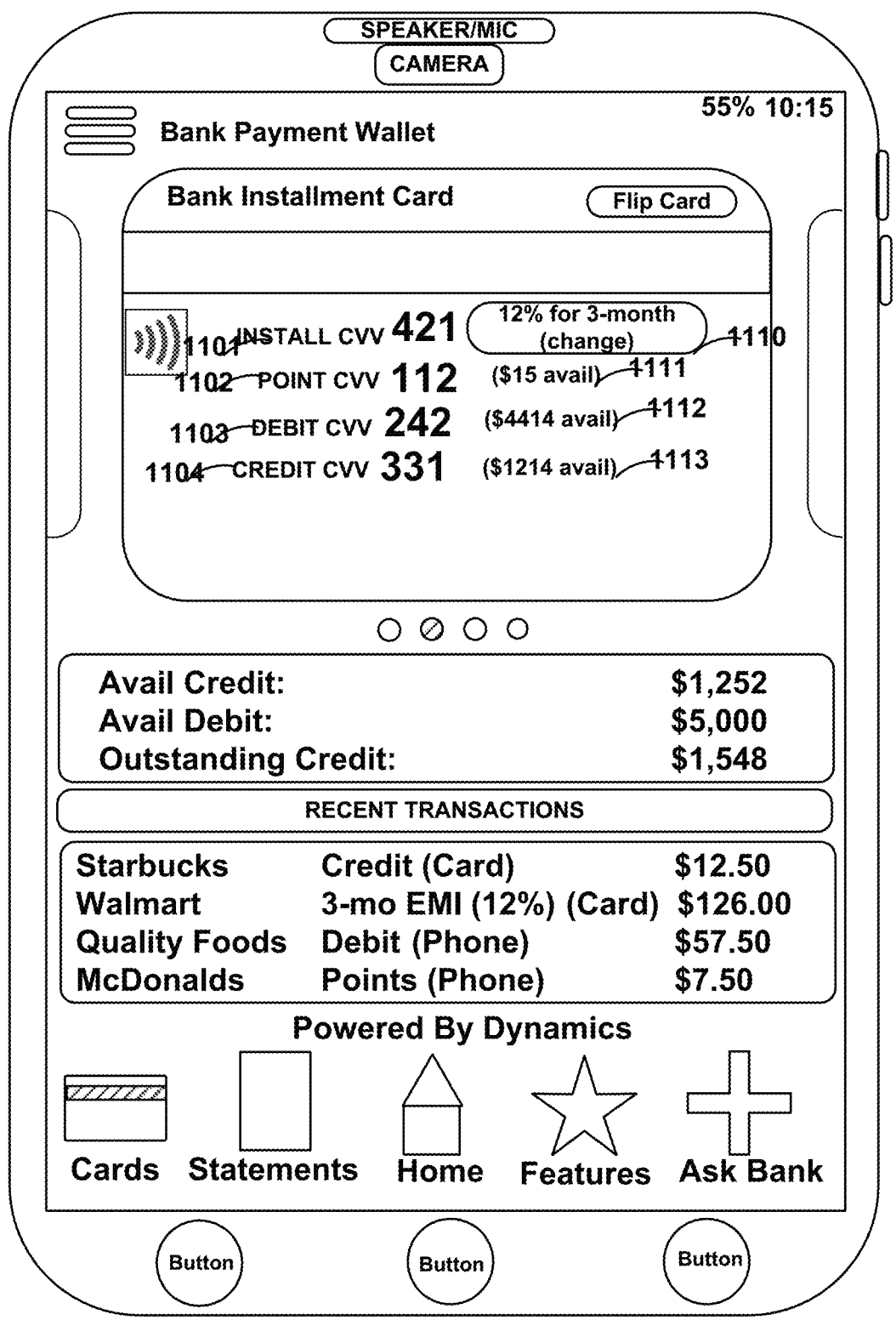
FIG. 11 is an illustration of a device constructed in accordance with the principles of the present invention.

FIG. 11 may include device 1100 which may show another side of a card (e.g., the reverse side of card 1000 of FIG. 10) and may include security codes 621-624. Persons skilled in the art will appreciate a different security code (e.g., CVC and/or CVV) may be associated with different options so that the virtual card can be utilized for online transactions with the same capability as in-store transactions. One or more installment security codes, point security codes, debit security codes, credit security codes, and other security codes associated with payment options and/or accounts may be utilized and these codes may be printed on devices (e.g., cards) as well as displayed on devices (e.g., battery-powered cards). Option 1110 may be utilized so that a cardholder may, for example, change the terms associated with a feature (e.g., the terms associated with an installment). Accordingly, for example, a cardholder may change the installment terms for one or more transactions (e.g., transactions going forward until changed). An installment transaction may on any device (e.g., card, phone, statements) be changed after a transaction is made. For example, a cardholder can go to a statement and can change credit transactions to point and/or installment (e.g., part point, part installment) transactions (or another option) and can change installment terms at any time. For example, a cardholder that is on month 2 of a 6 month installment may change the installment to month 2 of a 12 month installment. A fee (e.g., fixed and/or percentage amount) may be charged for the change or as the functionality is deployed (e.g., as the installments occur in the future). Accordingly, a cardholder may have a dynamic statement where any transaction can be moved to another transaction type or option and may be, for example, get a new/additional cost and/or fee.

Information about an account may also be shown on the back of a card such as, for example, next to a security code associated with the information. Persons skilled in the art will appreciate that security codes for a payment card number, or another feature, may be provided on the same side as the payment card number. Indicia 1111 may be, for example, dynamic and may include the available point balance and may be associated with security code 1102. Option 1110 may be associated with security code 1101. Indicia 1112 may be associated with security code 1103 and may include the amount of available debit funds. Indicia 1113 may be associated with security code 1104 and may include the available credit line remaining. Person skilled in the art will appreciate that any information from any card or device may be communicated to another card or device and displayed. Accordingly, for example, indicia 1111-1113 may be communicated to a physical card that corresponds to the virtual card associated with indicia 1111-113 and displayed on the physical card.

Dynamics statements may be provided in which a cardholder can change past transactions from one type e.g., credit) to another (e.g., installment). Dynamic statements may have different sections associated with different transaction types (e.g., installment section and credit section) and a cardholder may take any credit transaction and move it to an installment (and vice versa). The statement may group transactions for installments based on original duration (e.g., group 12 month installments together or remaining duration. Transactions may be ordered chronologically, magnitude of amount, magnitude of interest rate, remaining duration of installment, originally duration of installment, etc. Cardholders, for a fee or without a fee, may change installment duration even after, for example, the first installment payment has been paid for a transaction. Persons skilled in the art will appreciate that in providing dynamic statements a cardholder may change, month-to-month or day-to-day, their transaction decisions to decisions that better fit their month-to-month or day-to-day situations. For example, a cardholder may have a car accident and decide the cardholder wants to convert a number of credit transactions to installment transactions and may want to extend installment length for another number of transactions. Alternatively, for example, a cardholder may get a larger bonus than expected and may want to pay off installments faster (e.g., pay off entire installments or reduce the length of installments) as well as move installments to credit transactions or pay an outstanding credit transaction or monthly bill of transactions.

Persons skilled in the art will appreciate that an issuer predictive system may also be provided that utilizes the data from the cards and devices such as the installment, credit, point, etc. selection data to determine price insensitivities and sensitivities in particular cardholders and provides pricing based on those insensitivities and/or sensitivities. Furthermore, for example, such a platform may review traditional cards of a particular payment network for an issuer and provide recommendations to that issue on what cardholders should be issued battery-powered cards, cards with intelligent and information receiving and utilizing payment applets, and other features and which network and/or products should be initially put on the cards or other devices. Such a system may take into account various network incentives such that a platform may provide recommendations on what particular cardholders should be upgraded with new card technology as well as changed to a new network. Such a platform may, for example, provide estimates of value generation (e.g., expanded purchases) made across one or a set of individuals (e.g., the upgraded individuals) as well as the estimated value gain for the cardholder so the cardholder may be marketed the value gained by the upgrade and/or conversion.

Persons skilled in the art will appreciate that one or more applets may be associated with different buttons or modes for cards or other devices. Applets may also be associated with non-payment functionality (e.g., identification) or closed loop payment systems (e.g., transit systems or store payment systems) in addition to open loop systems (e.g., general purpose cards of a multi-national payment network that operates in more than 90% of countries). A card may be non-powered, for example, and may include a mechanical switch that may be mechanically moved and when the card is powered by an external reader (e.g., an EMV contact and/or EMV contactless reader) circuitry may detect the mechanical position of this switch and utilize the different positions to denote different consumer selections (e.g., selections of different accounts, options, applets, or other functionality). Such a mechanical switch may have two states, three states, or more than three states and may take the form, for example, of a sliding switch, height denominated switch, or any other type of interface that may be put into different states without power (e.g., and that can be read by circuitry such as circuitry such as a cards contact and/or contactless chip when power is applied to that circuitry and/or chip(s)). Accordingly, for example, data from a mobile device may be sent down to one applet, two applets, more than two applets, or a subset of applets during a transaction or outside of a transaction and cards, or other devices, may utilize the received information to change the operation of the applet (e.g., provide a different account and/or payment option) in the current transaction or the next transaction (e.g., starting the next transaction).

Persons skilled in the art will appreciate that the present invention is not limited to only the embodiments described, and that features described in one embodiment may be used in a different embodiment. The present invention more generally involves dynamic information and devices. Persons skilled in the art will also appreciate that the apparatus of the present invention may be implemented in other ways than those described herein. All such modifications are within the scope of the present invention, which is limited only by the claims that follow.

What is claimed is:

1. A payment card comprising:
an applet stored on a processing chip;
a contact structure coupled to said processing chip for electrically coupling said processing chip to a contact point-of-sale communication device to perform a contact payment transaction, wherein manual input data from an external device is operable to be communicated to said applet through said contact structure during said contact payment transaction, said applet receives said manual input data and determines whether to terminate said contact payment transaction and change payment data for a subsequent contact payment transaction based on said received manual input data.

2. The payment card of claim 1, wherein said RFID antenna coupled to said processing chip for electrically coupling said processing chip to a contactless point of sale communication device to perform a contactless transaction.

3. The payment card of claim 1, wherein said termination of said contact payment transaction occurs by said applet receiving an authorization for said contact payment transaction and not providing a confirmation of said authorization to said contact point-of-sale communication device.

4. The payment card of claim 1, wherein said manual input is representative of a debit card personal account number.

5. The payment card of claim 1, wherein said manual input is representative of a credit card personal account number.

6. The payment card of claim 1, wherein said external device is a wireless telephonic device.

7. The payment card of claim 1, further comprising a payment card personal account number, wherein said external device is a wireless telephonic device having a telephone number, wherein said telephone number and payment card personal account number are associated with the same entity.

8. The payment card of claim 1, further comprising a battery.

9. The payment card of claim 1, wherein said payment card does not include a battery.

10. The payment card of claim 1, further comprising a manual input interface.

11. The payment card of claim 1, wherein said payment card does not include a manual input device.

* * * * *